(12) United States Patent
Parker

(10) Patent No.: US 9,235,856 B2
(45) Date of Patent: Jan. 12, 2016

(54) PROVIDING OVERLAY NETWORKS VIA ELASTIC CLOUD NETWORKING

(75) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 624 days.

(21) Appl. No.: 13/554,375

(22) Filed: Jul. 20, 2012

(65) Prior Publication Data

US 2013/0121207 A1    May 16, 2013

Related U.S. Application Data

(63) Continuation-in-part of application No. 13/293,411, filed on Nov. 10, 2011.

(51) Int. Cl.
- *G06F 15/173* (2006.01)
- *G06Q 30/06* (2012.01)
- *H04L 12/12* (2006.01)
- *H04L 29/08* (2006.01)
- *H04W 24/02* (2009.01)

(52) U.S. Cl.
CPC ............... *G06Q 30/06* (2013.01); *H04L 12/12* (2013.01); *H04L 67/10* (2013.01); *H04W 24/02* (2013.01); *Y02B 60/34* (2013.01)

(58) Field of Classification Search
CPC ........ G06Q 30/06; H04L 12/12; H04L 67/10; H04W 24/02; Y02B 60/34
USPC .................................................. 709/203, 224
See application file for complete search history.

(56) References Cited

U.S. PATENT DOCUMENTS

| | | | | |
|---|---|---|---|---|
| 8,224,931 B1 * | 7/2012 | Brandwine | ......... | H04L 41/5051 370/255 |
| 8,484,355 B1 * | 7/2013 | Lochhead | ........... | H04L 41/0806 709/222 |
| 8,565,108 B1 * | 10/2013 | Marshall | ................. | G06F 21/60 370/252 |
| 8,621,058 B2 | 12/2013 | Eswaran et al. | | |
| 8,671,176 B1 * | 3/2014 | Kharitonov | ............. | H04L 45/02 709/219 |
| 8,804,520 B2 | 8/2014 | Cortes Gomez | | |
| 8,804,745 B1 * | 8/2014 | Sinn | ........................ | H04L 45/42 370/352 |
| 8,806,482 B1 * | 8/2014 | Nagargadde | ........ | G06F 9/45533 709/224 |
| 8,867,361 B2 | 10/2014 | Kempf et al. | | |
| 8,873,398 B2 | 10/2014 | Kempf et al. | | |
| 2006/0155708 A1 * | 7/2006 | Brown et al. | .................... | 707/10 |
| 2008/0295095 A1 * | 11/2008 | Watanabe | ........... | G06F 11/0712 718/1 |
| 2009/0276771 A1 * | 11/2009 | Nickolov | .............. | G06F 9/4856 717/177 |
| 2010/0332617 A1 | 12/2010 | Goodwin et al. | | |
| 2011/0022694 A1 | 1/2011 | Dalal et al. | | |
| 2011/0022812 A1 * | 1/2011 | van der Linden | ..... | G06F 9/5077 711/163 |
| 2012/0089980 A1 * | 4/2012 | Sharp | .................. | G06F 9/45558 718/1 |
| 2012/0110014 A1 * | 5/2012 | Snelling | ........................ | 707/776 |

(Continued)

*Primary Examiner* — Phuoc Nguyen
*Assistant Examiner* — Davoud Zand

(57) ABSTRACT

A device receives network infrastructure requirements from a user, and selects, based on the network infrastructure requirements, at least one of a virtual core network, a virtual network resource, and a virtual system from resources provided in a cloud computing environment. The device also enables use of the selected at least one of the virtual core network, the virtual network resource, and the virtual system by the user. The device receives, from the user, traffic destined for the selected at least one of the virtual core network, the virtual network resource, and the virtual system, and provides the traffic to the selected at least one of the virtual core network, the virtual network resource, and the virtual system.

20 Claims, 18 Drawing Sheets

(56) References Cited

U.S. PATENT DOCUMENTS

| | | |
|---|---|---|
| 2012/0110394 A1 | 5/2012 | Murakami et al. |
| 2012/0209947 A1 | 8/2012 | Glaser et al. |
| 2012/0290455 A1* | 11/2012 | Mays .................. G06F 9/5072 705/34 |
| 2012/0304170 A1* | 11/2012 | Morgan .............. G06F 9/45558 718/1 |
| 2012/0331050 A1 | 12/2012 | Wilbur et al. |
| 2013/0014033 A1* | 1/2013 | Hamick et al. ................ 715/757 |
| 2013/0121207 A1 | 5/2013 | Parker |
| 2013/0139158 A1* | 5/2013 | Astete ................ G06F 9/45533 718/1 |
| 2013/0276068 A1* | 10/2013 | Alwar ............................... 726/4 |
| 2013/0294403 A1 | 11/2013 | Srinivasan |
| 2013/0336286 A1 | 12/2013 | Anschutz |
| 2014/0052773 A1 | 2/2014 | Deng et al. |
| 2014/0082699 A1 | 3/2014 | Eicken et al. |
| 2014/0086150 A1 | 3/2014 | Lynch et al. |
| 2014/0153400 A1 | 6/2014 | Lee et al. |

* cited by examiner

FIG. 9
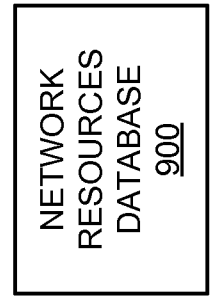

FIG. 10

540 → COLLECTION PRIMITIVES 1000 | BALANCING PRIMITIVES 1010 | SESSION PRIMITIVES 1020 | ANALYSIS PRIMITIVES 1030

PROVIDING OVERLAY NETWORKS VIA ELASTIC CLOUD NETWORKING

RELATED APPLICATION

This application is a continuation-in-part of U.S. patent application Ser. No. 13/293,411, filed Nov. 10, 2011, the entire content of which is hereby incorporated by reference.

BACKGROUND

Network planning is required prior to installation of a dedicated network, such as a long term evolution (LTE) network or an evolved packet core (EPC) network. Network planning is a time consuming process that includes identifying necessary network resources and communications connections for the network, and determining appropriate locations for the network resources and the communications connections. Once the planning is complete, the network resources and the communications connections may be installed at the determined locations. Network installation is both a time consuming and an expensive process. For example, as a new network architecture is created and deployed, there is a period of time where the new network architecture is not ready to handle network loads. However, dedicated network resources and communications connections do not need to be installed when they are readily available in data centers associated with a cloud computing environment.

Cloud computing is the delivery of computing as a service rather than as a product, whereby shared resources, software, and information are provided to client devices (e.g., computers, smart phones, etc.) as a utility over a network, such as the Internet. Cloud computing environments provide computation, software, data access, and/or storage services that do not require end-user knowledge of a physical location and configuration of a system that delivers the services.

A data center is a facility used to house computer systems and associated components, such as telecommunications devices and storage systems. A data center generally includes redundant or backup power supplies, redundant data communications connections, environmental controls (e.g., air conditioning, fire suppression, etc.), and security devices.

BRIEF DESCRIPTION OF THE DRAWINGS

FIG. 9 is a diagram of example functional components of a catalog of the ECN device;

FIG. 10 is a diagram of example functional components of a network primitives component of the ECN device;

DETAILED DESCRIPTION OF PREFERRED EMBODIMENTS

The following detailed description refers to the accompanying drawings. The same reference numbers in different drawings may identify the same or similar elements.

Systems and/or methods described herein may provide a network architecture using cloud computing techniques (e.g., virtual machines (VMs), hypervisors, etc.) to operate, manage, and scale systems of the network architecture. The systems and/or methods may lay a foundation for a transition from dedicated hardware-based network systems to using data center class computer systems for virtual network implementation. The systems and/or methods may create highly scalable virtual networks with lower operational and capital costs than current dedicated networks.

Figure 1:
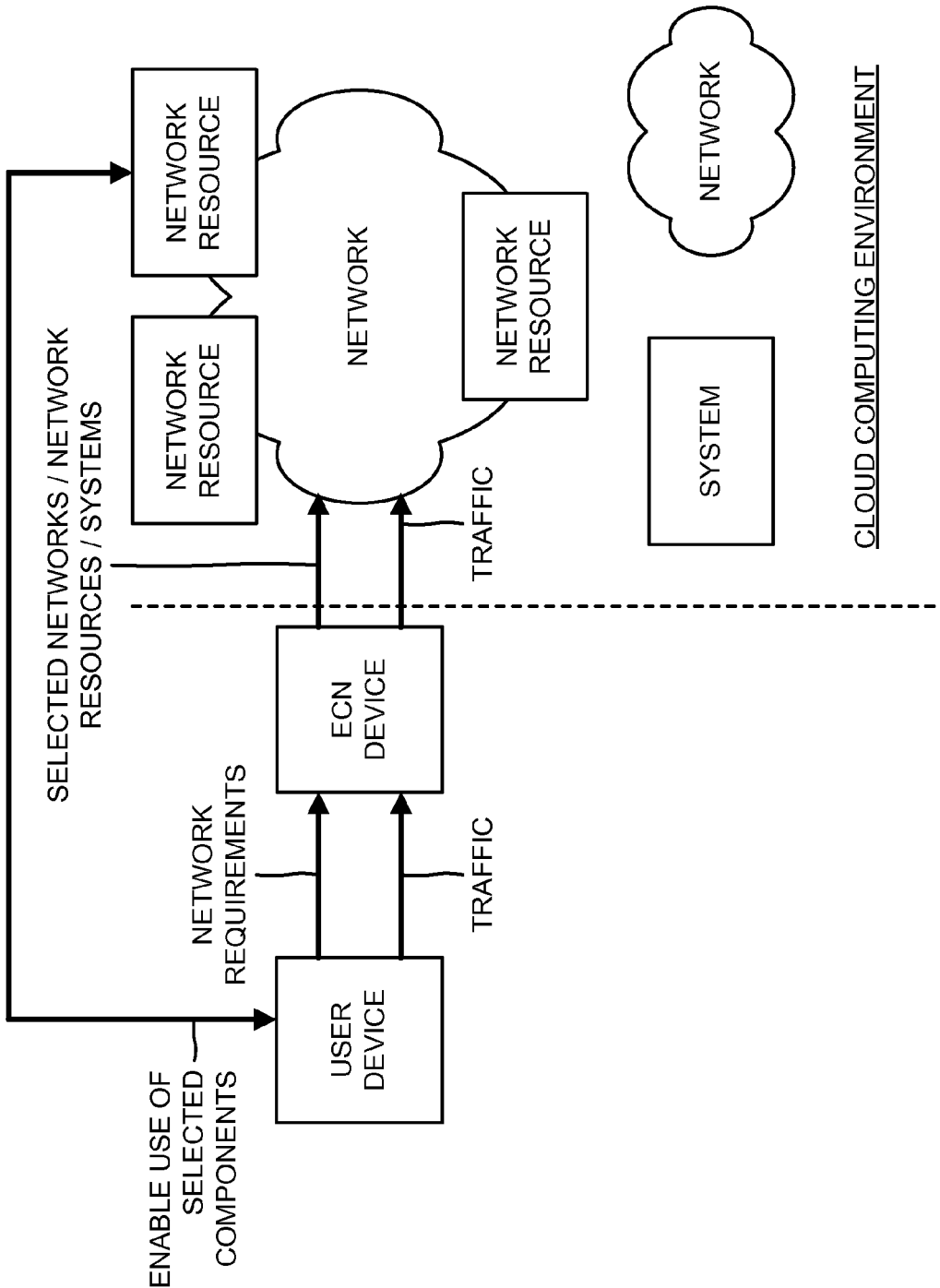
FIG. 1 is a diagram of an overview of an example implementation described herein.

FIG. 1 is a diagram of an overview of an example implementation described herein. As shown, overview may include a user device, an elastic cloud network (ECN) device, networks, network resources, and a system. The networks, the network resources, and the system may be virtually provided in a cloud computing environment that includes one or more data center devices. The user device may include a tablet computer, a desktop computer, a workstation computer, or other types of computation and/or communication devices. The ECN device may include one or more server devices that create and operate a virtual network infrastructure that virtualizes and aggregates networks, network resources, and systems into unified resource pools. In one example, the ECN device may be shared with multiple users (e.g., network operators) and may be referred to as a multiple operator core network (MOCN) configured device, such as a base station, an eNodeB, etc.

Each of the networks may include a network that interconnects the network resources, such as data center class devices, together. In one example, the network may include a virtualized core network, such as a virtualized EPC network. The network resources may include devices, data, services, etc. provided in one or more data centers. In one example, the network resources may include virtualized devices of an EPC network, such as a virtualized mobility management entity (MME), a virtualized serving gateway (SGW), etc. The system may include a device, a service, etc. provided in one or more data centers. In one example, the system may include a virtualized analytics and reporting system, a virtualized billing system, etc.

As further shown in FIG. 1, the user device may provide network requirements to the ECN device, and the ECN device may receive the network requirements. The network requirements may include information associated with virtual networks, network resources, and/or systems that a user of user device wishes to implement, such as capabilities associated with the networks, the network resources, and/or the systems, interactions between the networks, the network resources, and/or the systems, etc. Based on the network requirements, the ECN device may select one or more networks, network resources, and/or systems for the user device to utilize. The ECN device may enable the user device to utilize the selected one or more networks, network resources, and/or systems. For example, the ECN device may provide the user device with access to the data center devices that provide the functionality associated with the selected one or more networks, network resources, and/or systems.

Once the user device is enabled to utilize the selected one or more networks, network resources, and/or systems, the user device may provide traffic to the ECN device. The traffic may include, for example, a communication (e.g., a call, a short message service (SMS) message, etc.) to be routed by the selected one or more networks and/or network resources; information (e.g., billing information) to be provided to a selected system; etc. The ECN device may receive the traffic, and may provide the traffic to the selected one or more networks, network resources, and/or systems.

As used herein, the term "user" is intended to be broadly interpreted to include a user device or an ECN device, or a user of a user device or an ECN device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
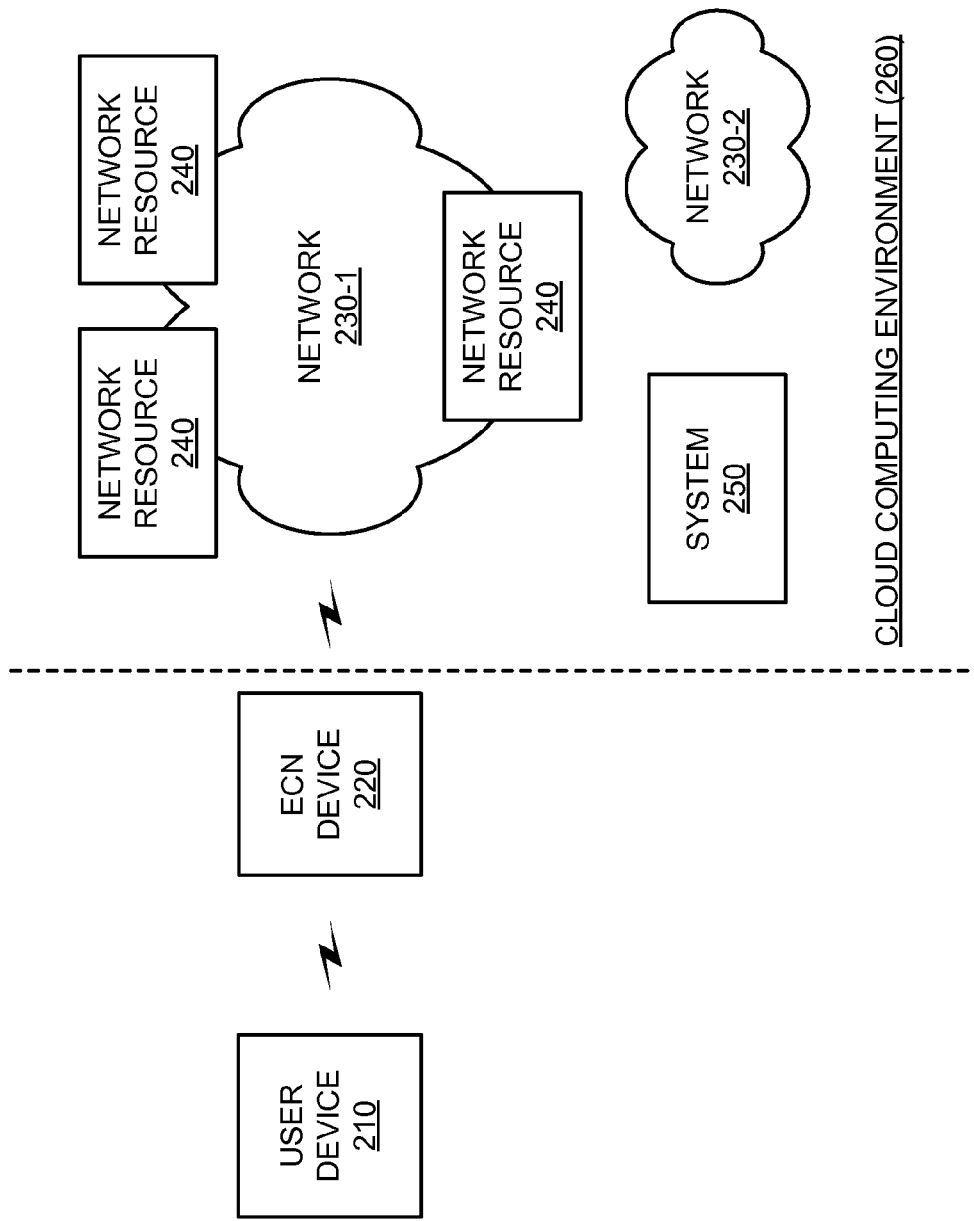
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, an ECN device 220, networks 230-1 and 230-2 (that each may include multiple network resources 240), and a system 250. Networks 230-1 and 230-2 may be referred to collectively herein as networks 230, or, in some instances, individually as network 230. Networks 230-1 and 230-2, network resources 240, and system 250 may be provided by one or more data center devices in a cloud computing environment 260. Thus, networks 230-1 and 230-2, network resources 240, and system 250 may be virtualized forms of networks, network resources, and a system that is provided by the one or more data center devices.

Devices and/or networks of environment 200 may interconnect via wired and/or wireless connections. One user device 210, one ECN device 220, two networks 230, three network resources 240, one system 250, and one cloud computing environment 260 have been illustrated in FIG. 2 for simplicity. In practice, there may be more user devices 210, ECN devices 220, networks 230, network resources 240, systems 250, and/or cloud computing environments 260.

User device 210 may include a radiotelephone; a personal communications system (PCS) terminal that may combine, for example, a cellular radiotelephone with data processing and data communications capabilities; a smart phone; a personal digital assistant (PDA) that can include, for example, one or more of a radiotelephone, a pager, Internet/intranet access, etc.; a laptop computer; a tablet computer; a desktop computer; a workstation computer; or other types of computation and communication devices. In one example, user device 210 may include a device that is capable of communicating with ECN device 220.

ECN device 220 may include one or more server devices, or other types of computation and communication devices, that gather, process, search, and/or provide information in a manner described herein. In one example implementation, ECN device 220 may create and operate a virtual network infrastructure that virtualizes networks 230, network resources 240, and/or systems 250. ECN device 220 may provide a network architecture using cloud computing techniques to operate, manage, and scale systems of the network architecture. ECN device 220 may lay a foundation for a transition from dedicated hardware-based network systems to using data center class computer systems (e.g., networks 230, network resources 240, and/or systems 250) for virtual network implementation. ECN device 220 may create highly scalable virtual networks with lower operational and capital costs than current dedicated networks, and may provide network primitives that collect operational information associated with the virtual networks.

Network 230 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. In one example implementation, network 230 may include a network that interconnects network resources 240, such as data center class devices, together.

Network resource 240 may include a device (e.g., a network device, a server, a computer system, etc.), data (e.g., availability information, license information, etc.), a service (e.g., a load balancing service, network information collection, etc.), or any other type of resource available for a network. A network device may include a gateway, a router, a switch, a firewall, a network interface card (NIC), a hub, a bridge, a proxy server, a multiplexer, or some other type of device that processes and/or transfers traffic. In one example implementation, network resource 240 may include devices, data, services, etc. provided in one or more data centers.

System 250 may include a device (e.g., a network device, a server, a computer system, etc.) that provides one or more services for user device 210. For example, system 250 may provide a virtualized billing system that enables user device 210 to manage billing information associated with user device 210. Alternatively, or additionally, system 250 may provide a virtualized analytics and reporting system that enables user device 210 to implement business intelligence functions within a network associated with user device 210.

Cloud computing environment 260 may include one or more data center devices that deliver computing as a service rather than as a product, whereby shared resources, software, and information are provided to client devices (e.g., computers, smart phones, etc.) as a utility over a network, such as the Internet. Cloud computing environment 260 may provide computation, software, data access, and/or storage services that do not require end-user knowledge of a physical location and configuration of a system that delivers the services.

Although FIG. 2 shows example devices/networks of environment 200, in other implementations, environment 200 may include fewer devices/networks, different devices/networks, differently arranged devices/networks, or additional devices/networks than depicted in FIG. 2. Alternatively, or additionally, one or more devices/networks of environment

200 may perform one or more other tasks described as being performed by one or more other devices/networks of environment 200.

Figure 3:
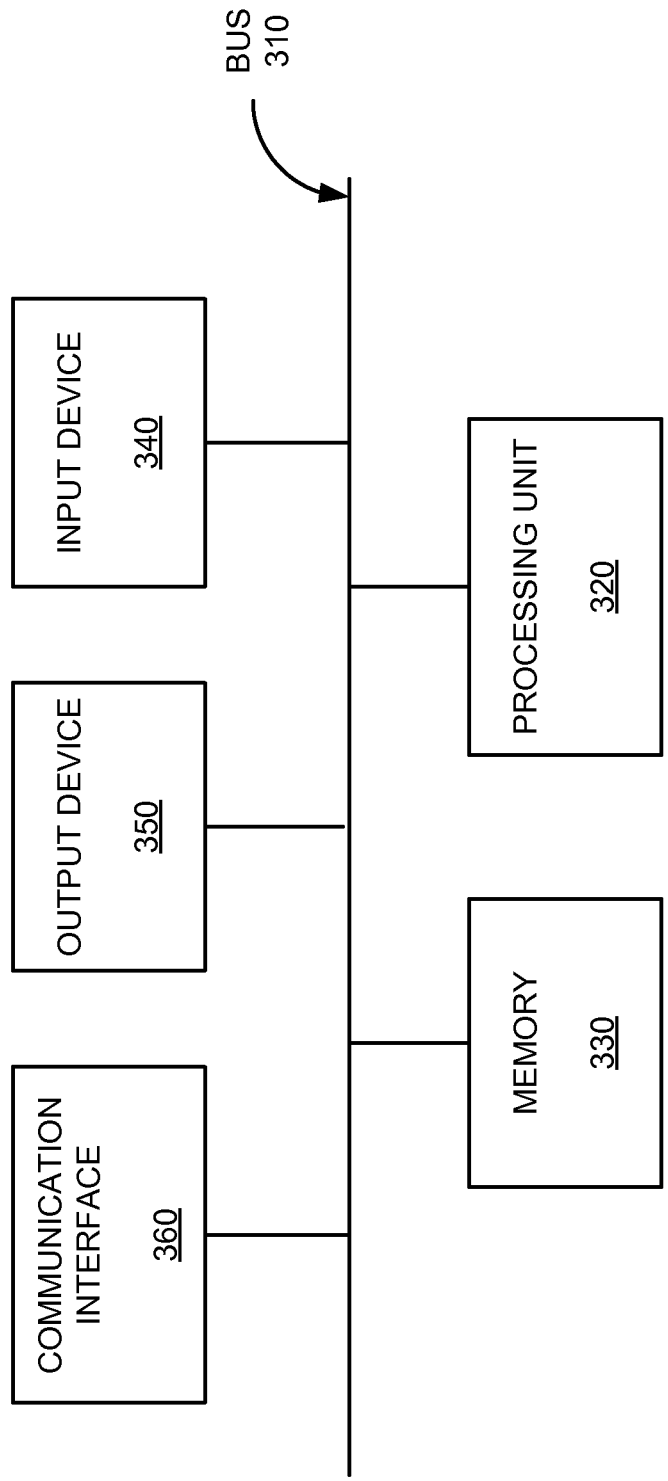
FIG. 3 is a diagram of example components of a device that may correspond to one of the devices of the environment depicted in FIG. 2.

FIG. 3 is a diagram of example components of a device 300 that may correspond to one or more devices of environment 200 (FIG. 2). In one example implementation, one or more of the devices of environment 200 may include one or more devices 300 or one or more components of device 300. As illustrated in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a touch screen display, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of environment 300.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
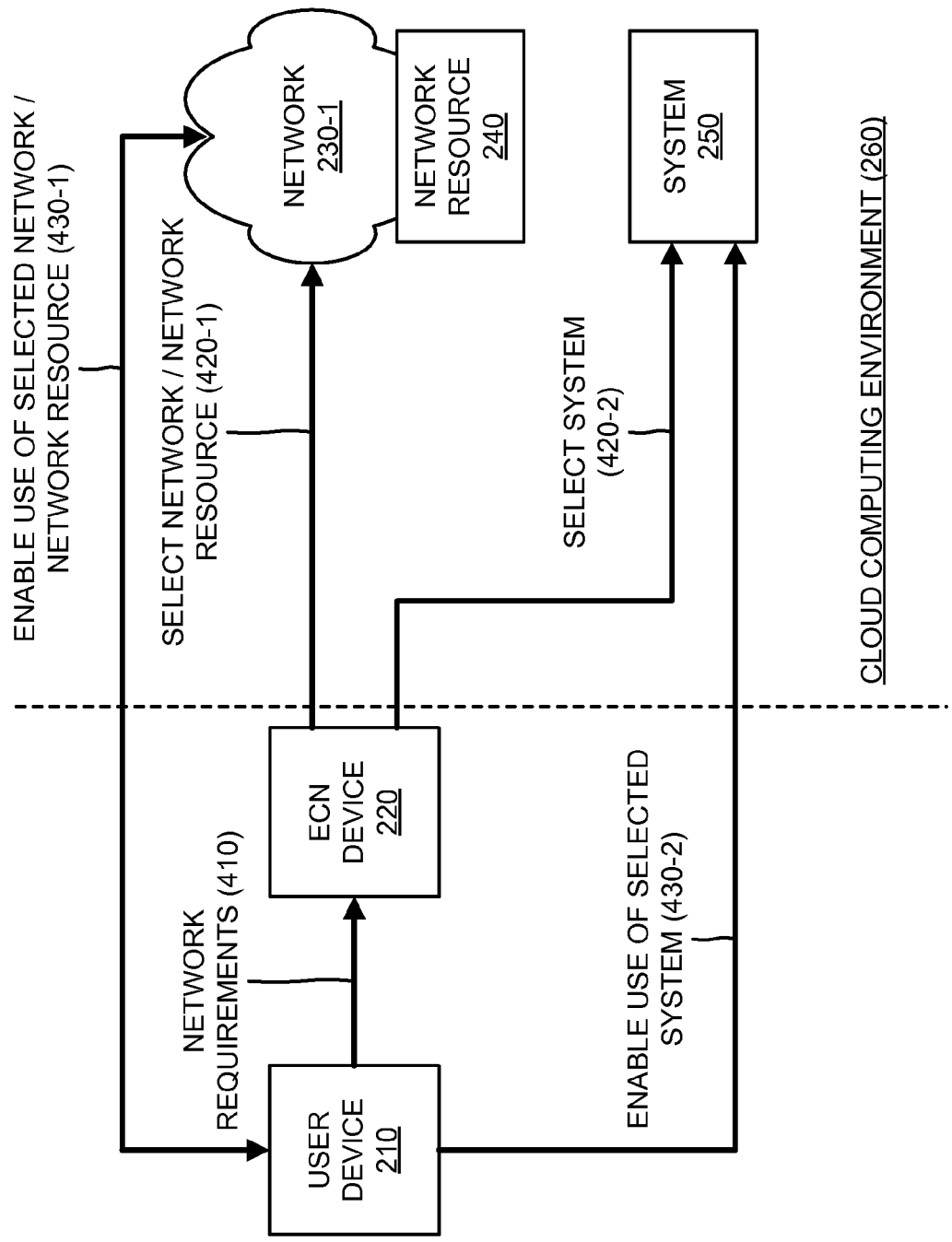
FIG. 4 is a diagram of example operations capable of being performed by an example portion of the environment in FIG. 2.

FIG. 4 is a diagram of example operations capable of being performed by an example portion 400 of environment 200 (FIG. 2). As shown, environment portion 400 may include user device 210, ECN device 220, network 230-1, network resource 240, and system 250. User device 210, ECN device 220, network 230-1, network resource 240, and system 250 may include the features described above in connection with, for example, one or more of FIGS. 1-3.

With reference to FIG. 4, a user (not shown) of user device 210 may provide network requirements 410 to user device 210. Network requirements 410 may include information associated with a virtual network that the user wishes to implement, such as networks, network resources, and/or systems required for the virtual network, capabilities associated with the networks, network resources, and/or systems, interactions between the networks, network resources, and/or systems, etc. User device 210 may provide network requirements 410 to ECN device 220, and ECN device 220 may receive network requirements 410. Based on network requirements 410, ECN device 220 may select one or more networks, network resources, and/or systems for user device 210 to utilize. For example, as shown in FIG. 4, ECN device 220 may select, based on network requirements 410, network 230-1 and network resource 240 for user device 210 to utilize, as indicated by reference number 420-1. ECN device 220 may also select, based on network requirements 410, system 250 for user device 210 to utilize, as indicated by reference number 420-2.

ECN device 220 may enable user device 210 to utilize the selected one or more networks, network resources, and/or systems. For example, ECN device 220 may provide user device 210 with access to the data center devices that provide the functionality associated with the selected one or more networks, network resources, and/or systems. As shown in FIG. 4, ECN device 220 may enable user device 210 to utilize network 230-1 and network resource 240, as indicated by reference number 430-1. ECN device 220 may also enable user device 210 to utilize system 250, as indicated by reference number 430-2.

Once user device 210 is enabled to utilize the selected one or more networks, network resources, and/or systems, user device 210 may provide traffic to ECN device 220. The traffic may include, for example, a communication (e.g., a call, a SMS message, data, etc.) to be routed by the selected one or more networks and/or network resources; information (e.g., billing information) to be provided to a selected system; etc. ECN device 220 may receive the traffic, and may provide the traffic to the selected one or more networks, network resources, and/or systems. Alternatively, or additionally, user device 210 may provide the traffic directly to the selected one or more networks, network resources, and/or systems, without passing through ECN device 220.

Although FIG. 4 shows example components of environment portion 400, in other implementations, environment portion 400 may include fewer components, different components, differently arranged components, or additional components than depicted in FIG. 4. Additionally, or alternatively, one or more components of environment portion 400 may perform one or more other tasks described as being performed by one or more other components of environment portion 400.

Figure 5:
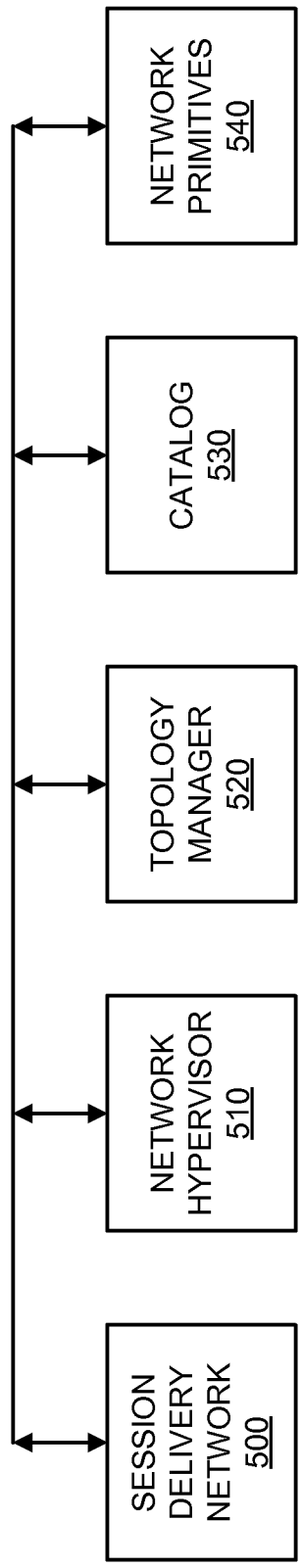
FIG. 5 is a diagram of example functional components of an elastic cloud network (ECN) device of FIG. 2.

FIG. 5 is a diagram of example functional components of ECN device 220. In one implementation, the functions described in connection with FIG. 5 may be performed by one or more components of device 300 (FIG. 3) or by one or more devices 300. As shown in FIG. 5, ECN device 220 may include a session delivery network (SDN) component 500, a network hypervisor 510, a topology manager 520, a catalog 530, and a network primitives component 540.

SDN component 500 may be responsible for managing network primitives that may be required to implement a scalable virtual network. SDN component 500 may also provide session continuity across networks 230, network resources 240, and/or systems 250, and may function as an interface to a transport network. SDN component 500 may provide transport from the network primitives to data storage devices, and may create a single virtual cluster across networks 230. SDN component 500 may select appropriate network resources 240 based on requirements established in catalog 530, and may provide transport and security across networks 230.

Network hypervisor 510 may provide virtualization-based distribution network infrastructure services, such as resource management, to dynamically and intelligently optimize available resources among virtual machines. Network hypervisor 510 may provide data protection for reliable and cost effective disaster recovery, security, and integrity to protect infrastructure of networks 230, network resources 240, and/or systems 250 from data center vulnerabilities. In one example, network hypervisor 510 may provide carrier-grade network resource management that ensures that selected networks 230, network resources 240, and/or systems 250 are allotted the appropriate processing, memory, and storage resources. Network hypervisor 510 may enable network administrators to operate and troubleshoot virtual networks using similar tools and procedures used for dedicated hardware-based networks. Network hypervisor 510 may work in concert with SDN component 500, topology manager 520, networks 230, network resources 240, and/or systems 250 to provide carrier class features that implement a virtual network.

Topology manager 520 may permit users (e.g., network administrators) to manage virtual systems created in networks 230, network resources 240, and/or systems 250 as though the virtual systems were physically dedicated systems. Topology manager 520 may enable users (e.g., via user interfaces) to specify and view a logical network topology and how the logical network topology translates to a virtual network topology. For example, topology manager 520 may enable a user to select which network resources 240 of network 230-1 to utilize and how the selected network resources 240 are to interact with other network resources 240 associated with other virtual systems. Topology manager 520 may provide the topology to SDN component 500, network hypervisor 510, and other systems in order to create a complete virtual network. Topology manager 520 may create a formatted high level design (HLD) document of the virtual network that may be used to assist in trouble-shooting the virtual network.

Catalog 530 may include representations of networks 230, network resources 240, and/or systems 250; capability information associated with networks 230, network resources 240, and/or systems 250; availability information associated with networks 230, network resources 240, and/or systems 250; license status information associated with networks 230, network resources 240, and/or systems 250; operating requirements of networks 230, network resources 240, and/or systems 250; etc. Catalog 530 may provide such information to a user (e.g., via user device 210), to SDN component 500, to network hypervisor 510, and to topology manager 520 so that virtual networks may be created and managed.

Network primitives component 540 may provide network primitives that may be accessed and utilized as needed by virtual networks. The network primitives may provide a variety of services, such as fault management collection, performance management collection, load balancing, etc. In one example, the network primitives may collect fault management and performance management data, and may transport the data to one or more storage devices for analysis by ECN device 220 or by a user. The network primitives may be automatically instantiated when a virtual network device is instantiated, and Internet protocol (IP) addresses for the network primitives may be presented by topology manager 520.

Although FIG. 5 shows example functional components of ECN device 220, in other implementations, ECN device 220 may include fewer functional components, different functional components, differently arranged functional components, or additional functional components than depicted in FIG. 5. Additionally, or alternatively, one or more functional components of ECN device 220 may perform one or more other tasks described as being performed by one or more other functional components of ECN device 220.

Figure 6:
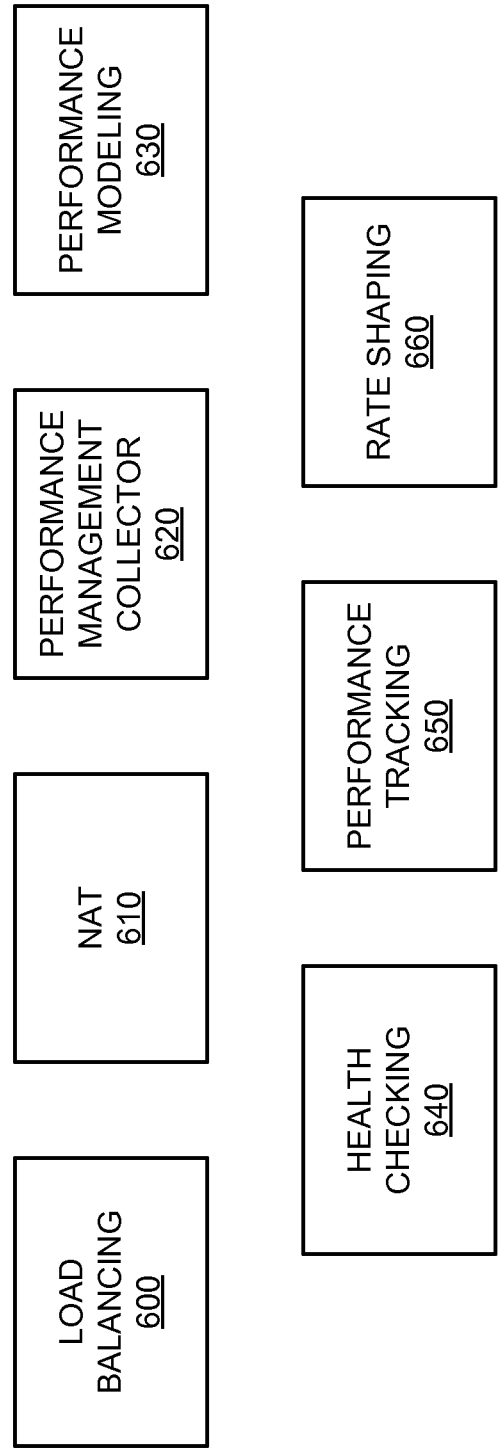
FIG. 6 is a diagram of example functional components of a session delivery network (SDN) component of the ECN device.

FIG. 6 is a diagram of example functional components of SDN component 500. In one implementation, the functions described in connection with FIG. 6 may be performed by one or more components of device 300 (FIG. 3) or by one or more devices 300. As shown in FIG. 6, SDN component 500 may include a load balancing component 600, a network address translation (NAT) component 610, a performance management collector 620, a performance modeling component 630, a health checking component 640, a performance tracking component 650, and a rate shaping component 660.

Load balancing component 600 may perform load balancing services for networks 230, network resources 240, and/or systems 250 provided in a virtual network. For example, load balancing component 600 may distribute workload across multiple network resources 240 to achieve optimal network resource utilization, maximize throughput, minimize response time, and avoid overload. In one example implementation, load balancing component 600 may employ different load balancing techniques, such as domain name system (DNS) based load balancing, hardware based load balancing, and/or software based load balancing.

NAT component 610 may perform NAT services for networks 230, network resources 240, and/or systems 250 provided in a virtual network. For example, NAT component 610 may modify IP address information in IP packet headers while in transit across traffic routing devices, such as network resources 240. In one example implementation, NAT component 610 may employ different NAT techniques, such as NAT 444 techniques, NAT 446 techniques, etc.

Performance management collector 620 may collect performance management information associated with networks 230, network resources 240, and/or systems 250 provided in a virtual network. For example, performance management collector 620 may perform NetFlow-based traffic collection, simple network management protocol (SNMP)-based traffic collection, session initiation protocol (SIP) flow information exchange (SIPFix)-based traffic collection, pilot packet-based traffic collection, etc. associated with networks 230, network resources 240, and/or systems 250 provided in the virtual network.

Performance modeling component 630 may provide performance modeling for networks 230, network resources 240, and/or systems 250 provided in a virtual network. For example, performance modeling component 630 may determine when a virtual network may scale (e.g., grow or shrink) based on the performance modeling. Performance modeling component 630 may determine what SDN component 500 resources to scale when new networks 230, network resources 240, and/or systems 250 are provided in the virtual network.

Health checking component 640 may perform health checking services for networks 230, network resources 240, and/or systems 250 provided in a virtual network. For example, health checking component 640 may perform a health check on networks 230, network resources 240, and/or systems 250 with a particular frequency, using a particular protocol, and using particular actions.

Performance tracking component 650 may provide performance tracking services for networks 230, network resources 240, and/or systems 250 provided in a virtual network. For example, performance tracking component 650 may perform session and flow latency tracking, session and flow packet loss tracking, etc. for networks 230, network resources 240, and/or systems 250 provided in a virtual network.

Rate shaping component 660 may perform rate shaping services for networks 230, network resources 240, and/or systems 250 provided in a virtual network. For example, rate shaping component 660 may manage bandwidth associated with network resources 240 to ensure that priority applications are delivered without delay. For network 230 and network resources 240, rate shaping component 660 may ensure quality of service (QoS), may defend against bandwidth-abusing denial of service (DoS) attacks, and may protect against traffic spikes, abusive users, and network attacks.

Although FIG. 6 shows example functional components of SDN component 500, in other implementations, SDN component 500 may include fewer functional components, different functional components, differently arranged functional components, or additional functional components than depicted in FIG. 6. Additionally, or alternatively, one or more functional components of SDN component 500 may perform one or more other tasks described as being performed by one or more other functional components of SDN component 500.

Figure 7:
FIG. 7 is a diagram of example functional components of a network hypervisor of the ECN device.

FIG. 7 is a diagram of example functional components of network hypervisor 510. In one implementation, the functions described in connection with FIG. 7 may be performed by one or more components of device 300 (FIG. 3) or by one or more devices 300. As shown in FIG. 7, network hypervisor 510 may include an attributes state analysis component 700, a future attributes state analysis component 710, a virtual network operation component 720, a security policy component 730, and a model capacity component 740.

Attributes state analysis component 700 may analyze a current state of attributes associated with operation of networks 230, network resources 240, and/or systems 250 of virtual networks. For example, attributes state analysis component 700 may analyze a current state of bandwidth, processor utilization, memory utilization, concurrent flows, etc. associated with networks 230, network resources 240, and/or systems 250 of the virtual networks.

Future attributes state analysis component 710 may analyze a future (or predictive) state of attributes associated with operation of networks 230, network resources 240, and/or systems 250 of virtual networks. For example, future attributes state analysis component 710 may analyze a future state of bandwidth, processor utilization, memory utilization, concurrent flows, etc. associated with networks 230, network resources 240, and/or systems 250 of the virtual networks.

Virtual network operation component 720 may implement networks 230, network resources 240, and/or systems 250 of virtual networks, and may ensure that networks 230, network resources 240, and/or systems 250 are operating properly. Virtual network operation component 720 may ensure the health of networks 230, network resources 240, and/or systems 250 while networks 230, network resources 240, and/or systems 250 are being used for the virtual networks.

Security policy component 730 may modify security policies of particular network resources 240 (e.g., switches, firewalls, etc.) so that network resources 240 of virtual networks may be implemented in accordance with security policies.

Model capacity component 740 may model a capacity of networks 230, network resources 240, and/or systems 250 of virtual networks in near real time. In one example, model capacity component 740 may plan for the growth or reduction of networks 230, network resources 240, and/or systems 250 of the virtual networks based on the modeled capacity.

Although FIG. 7 shows example functional components of network hypervisor 510, in other implementations, network hypervisor 510 may include fewer functional components, different functional components, differently arranged functional components, or additional functional components than depicted in FIG. 7. Additionally, or alternatively, one or more functional components of network hypervisor 510 may perform one or more other tasks described as being performed by one or more other functional components of network hypervisor 510.

Figure 8:
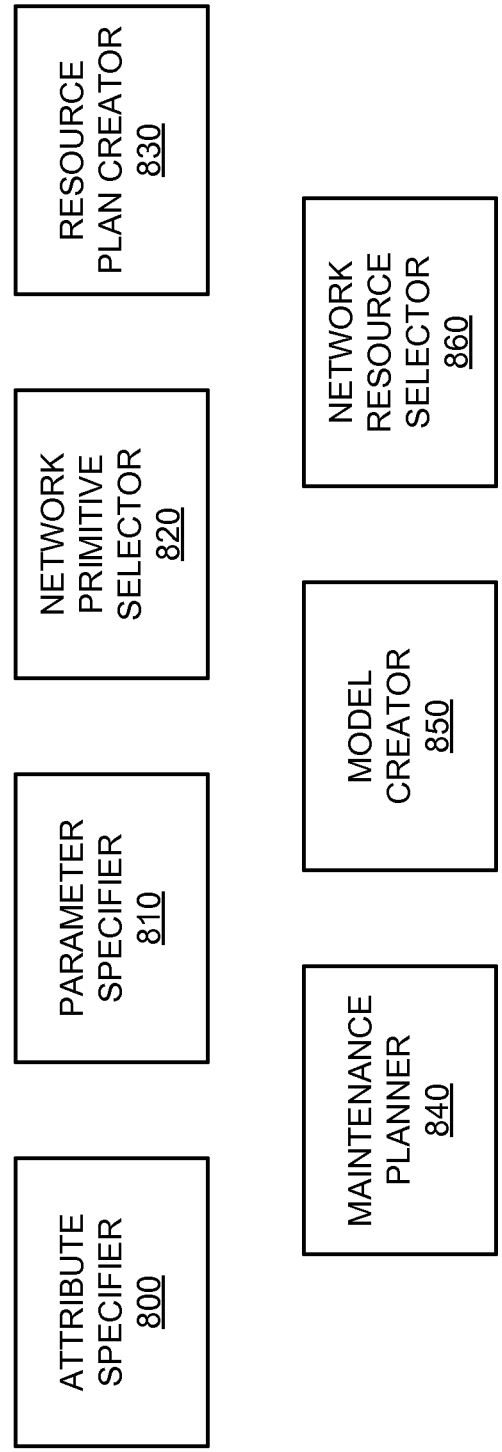
FIG. 8 is a diagram of example functional components of a topology manager of the ECN device.

FIG. 8 is a diagram of example functional components of topology manager 520. In one implementation, the functions described in connection with FIG. 8 may be performed by one or more components of device 300 (FIG. 3) or by one or more devices 300. As shown in FIG. 8, topology manager 520 may include an attribute specifier 800, a parameter specifier 810, a network primitive selector 820, a resource plan creator 830, a maintenance planner 840, a model creator 850, and a network resource selector 860.

Attribute specifier 800 may enable a user to specify network attributes that are required to deploy networks 230, network resources 240, and/or systems 250 in virtual networks. In one example, the network attributes may include common language location identifier (CLLI) codes, locations of virtual resource pools, system types, operational status information, bearer IP addresses, management IP addresses, etc. associated with networks 230, network resources 240, and/or systems 250.

Parameter specifier 810 may enable a user to specify parameters associated with networks 230, network resources 240, and/or systems 250 in virtual networks. In one example, the parameters may include fault management parameters; performance management parameters; sample rates associated with the fault management and performance management parameters; protocols (e.g., SNMP) associated with the fault management and performance management parameters; failover requirements; scaling parameters (e.g., maximum number of flows, maximum processor utilization, maximum memory utilization, scaling trigger points, maximum number of virtual instances per location, etc.); upgrade and downgrade information; etc. associated with networks 230, network resources 240, and/or systems 250.

Network primitive selector 820 may work with SDN component 500 to select and implement appropriate network primitives in concert with the implementation of networks 230, network resources 240, and/or systems 250 of virtual networks.

Resource plan creator 830 may prepare a resource plan that determines all required resources when networks 230, network resources 240, and/or systems 250 for a virtual network is established. In one example, the required resources may include a number of processors, memory, storage, transport information, security information, etc. associated with networks 230, network resources 240, and/or systems 250 for a virtual network.

Maintenance planner 840 may work with SDN component 500 to plan maintenance events for networks 230, network resources 240, and/or systems 250 of virtual networks. For example, the maintenance events may include an upgrade to a virtual network, a downgrade to a virtual network, removal of one or more networks 230, network resources 240, and/or systems 250 from a virtual network, etc. Maintenance planner 840 may generate a step-by-step maintenance operation program (MOP) that may be approved by specific personnel before the MOP may be executed.

Model creator 850 may prepare predictive analytics-based models that provide past, present, and/or future scale and performance information associated with virtual networks. In one example, the models may include information, such as flow counts, bandwidth, flow durations, national, regional, and instance level views, etc. associated with the virtual networks.

Network resource selector 860 may permit the provisioning of virtual services across networks 230, and may permit a user to designate network resources 240 to be used or may automatically select or suggest network resources 240 to the user. Network resource selector 860 may determine whether to suggest network resources 240 to the user based on processor capacity, memory resources, SDN transport resource capacity, storage capacity, switch capacity, proximity to non-virtual resources, etc. associated with network resources 240.

Although FIG. 8 shows example functional components of topology manager 520, in other implementations, topology manager 520 may include fewer functional components, different functional components, differently arranged functional components, or additional functional components than depicted in FIG. 8. Additionally, or alternatively, one or more functional components of topology manager 520 may perform one or more other tasks described as being performed by one or more other functional components of topology manager 520.

FIG. 9 is a diagram of example functional components of catalog 530. In one implementation, the functions described in connection with FIG. 9 may be performed by one or more components of device 300 (FIG. 3) or by one or more devices 300. As shown in FIG. 9, catalog 530 may include a network resources database 900 and a network attributes database 910.

Network resources database 900 may include a database of information associated with network resources 240 (e.g., representations of network resources 240) that may be under the control of network hypervisor 510. When a new network resource 240 is deployed in network 230, information associated with the new network resource 240 may be added to network resources database 900 once the new network resource 240 is certified as generally available by appropriate users. If information associated with a particular network resource 240 is provided in network resources database 900 and the particular network resource 240 has not been certified as generally available, the particular network resource 240 may not be assigned to a virtual network. Information associated with a particular network resource 240 may be removed from network resources database 900 by particular network administrators.

Network attributes database 910 may include a database of attributes of network resources 240 provided in network 230. The attributes may include, for example, manufacturer names, functions, software versions, license keys, scaling metrics, test and acceptance states, location dependencies, resource specific health checks, critical triggers, etc. associated with network resources 240.

Although FIG. 9 shows example functional components of catalog 530, in other implementations, catalog 530 may include fewer functional components, different functional components, differently arranged functional components, or additional functional components than depicted in FIG. 9. Additionally, or alternatively, one or more functional components of catalog 530 may perform one or more other tasks described as being performed by one or more other functional components of catalog 530.

FIG. 10 is a diagram of example functional components of network primitives component 540. In one implementation, the functions described in connection with FIG. 10 may be performed by one or more components of device 300 (FIG. 3) or by one or more devices 300. As shown in FIG. 10, network primitives component 540 may include a collection primitives component 1000, a balancing primitives component 1010, a session primitives component 1020, and an analysis primitives component 1030.

Collection primitives component 1000 may provide network primitives that perform collection services for networks 230, network resources 240, and/or systems 250 in virtual networks. In one example, the collection services may include NetFlow-based traffic collection, SNMP-based traffic collection, SIPFix-based traffic collection, Syslog traffic collection, etc. associated with networks 230, network resources 240, and/or systems 250 provided in the virtual networks.

Balancing primitives component 1010 may provide network primitives that perform balancing services for networks 230, network resources 240, and/or systems 250 in virtual networks. In one example, the balancing services may include flow tracing and troubleshooting services, local load balancing services, global load balancing services, etc. associated with networks 230, network resources 240, and/or systems 250 provided in the virtual networks.

Session primitives component 1020 may provide network primitives that perform session related services for networks 230, network resources 240, and/or systems 250 in virtual networks. In one example, the session related services may include Layer 5 session continuity services, session chaining services, transmission control protocol (TCP) optimization services, NAT services, etc. associated with networks 230, network resources 240, and/or systems 250 provided in the virtual networks.

Analysis primitives component 1030 may provide network primitives that perform analysis services for networks 230, network resources 240, and/or systems 250 in virtual networks. In one example, the analysis services may include latency tracking and analysis, packet loss tracking and analysis, etc. associated with networks 230, network resources 240, and/or systems 250 provided in the virtual networks.

Although FIG. 10 shows example functional components of network primitives component 540, in other implementations, network primitives component 540 may include fewer functional components, different functional components, differently arranged functional components, or additional functional components than depicted in FIG. 10. Additionally, or alternatively, one or more functional components of network primitives component 540 may perform one or more other tasks described as being performed by one or more other functional components of network primitives component 540.

Figure 11:
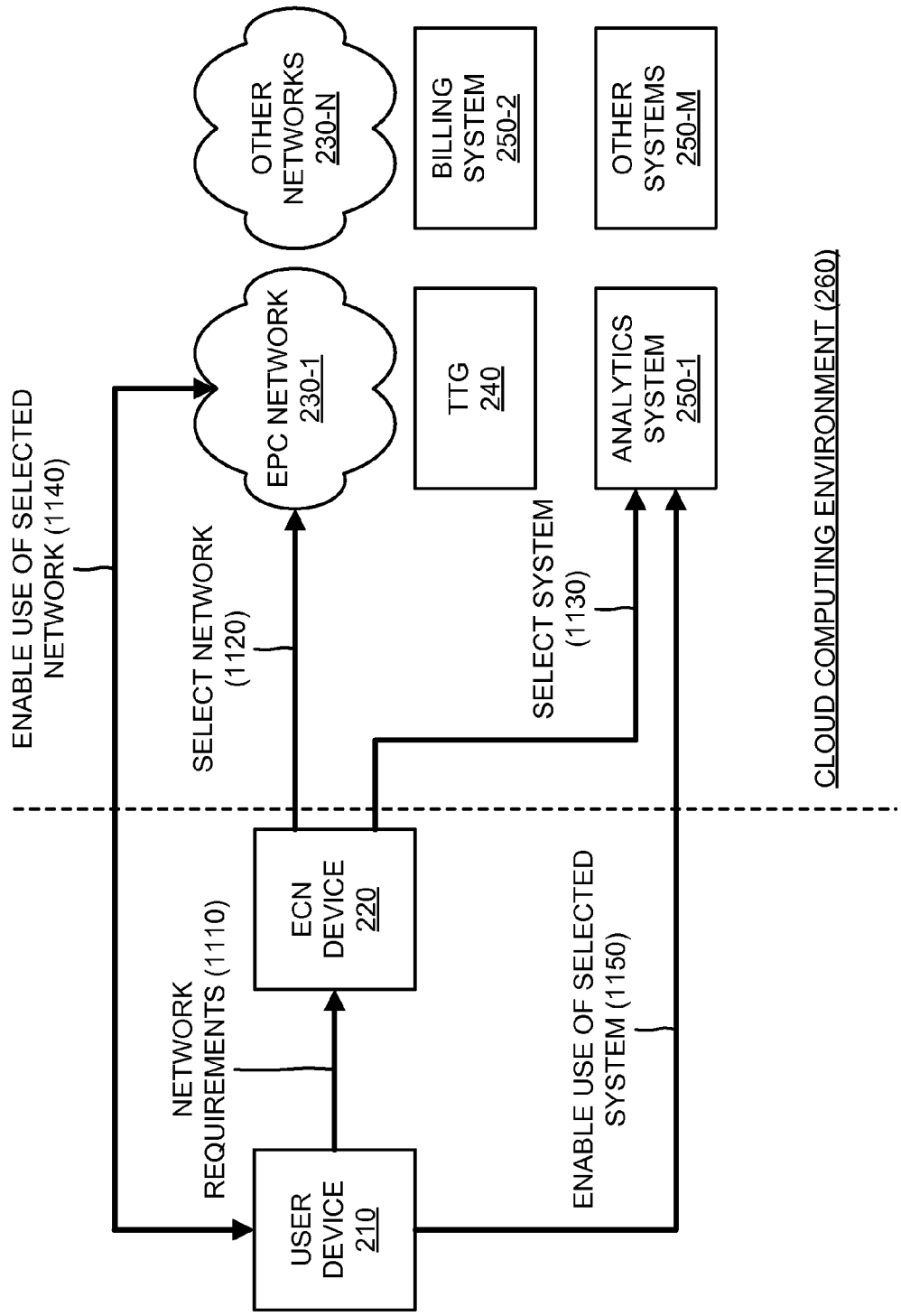
FIG. 11 is a diagram of example operations capable of being performed by another example portion of the environment in FIG. 2.

FIG. 11 is a diagram of example operations capable of being performed by another example portion 1100 of environment 200 (FIG. 2). As shown, environment portion 1100 may include user device 210, ECN device 220, an EPC network 230-1, other networks 230-N, a tunnel termination gateway (TTG) 240, an analytics and reporting system 250-1, a billing system 250-2, other systems 250-M, and cloud computing environment 260. User device 210, ECN device 220, EPC network 230-1, other networks 230-N, TTG 240, analytics and reporting system 250-1, billing system 250-2, other systems 250-M, and cloud computing environment 260 may include the features described above in connection with, for example, one or more of FIGS. 1-10.

Environment portion 1100 may offer a user (e.g., a network operator) with cloud-based network infrastructure solutions, such as a variety of network elements and/or operational models that the user may normally be unable to implement due to cost. Environment portion 1100 may provide such solutions at a lower cost, and may enable increased deployment speed, service enablement, and/or diverse operational models.

EPC network 230-1 may include a virtualized core network architecture of the Third Generation Partnership Project (3GPP) LTE wireless communication standard. In one example, EPC network 230-1 may include a virtualized all-IP packet-switched core network that supports high-speed wireless and wireline broadband access technologies. Alternatively, or additionally, EPC network 230-1 may provide packet-switched voice services (e.g., which are traditionally circuit-switched) using an IP Multimedia Subsystem (IMS) network. EPC network 230-1 may enable a user to deploy a low-cost core network using commercial off the shelf (COTS)-based hardware and cloud-based management systems. EPC network 230-1 may enable the user to build and operate a core network at a much lower cost than traditional core networks, and may enable services to be deployed much faster than in traditional core networks.

Other networks 230-N may include other virtualized networks available to the user via ECN device 220. For example, other networks 230-N may include a virtualized content delivery network, a virtualized session delivery network, etc.

TTG 240 may include a virtualized network device (e.g., a gateway, a router, a switch, etc.) that enables user device 210 to access EPC network 230-1 via networks (e.g., WiFi networks, Digital Subscriber Line (DSL) networks, etc.) not directly connected to ECN device 220.

Analytics and reporting system 250-1 may include a virtualized system that may provide business intelligence functions within a network where ECN device 220 is deployed. Analytics and reporting system 250-1 may be customized to support needs of the user and may be used for analyzing and providing reports associated with aspects of network operations and/or monetization.

Billing system 250-2 may include a virtualized system that provides billing services for the user (e.g., the network operator). The billing services may include, for example, generation of bills for customers of the user, accounting services for the user, generation of financial statements for the user, etc. Billing system 250-2 may be operated by the user or a third party not associated with the user. Billing system 250-2 may be integrated with an existing billing system of the user or may be provided in place of the user's billing system.

Other systems 250-M may include other virtualized systems available to the user via ECN device 220. For example, other systems 250-M may include a virtualized domain name system (DNS), a virtualized firewall, a virtualized load balancing system, etc.

A user (not shown) of user device 210 may provide network requirements 1110 to user device 210. Network requirements 1110 may include information associated with a virtual network that the user wishes to implement, such as networks, network resources, and/or systems required for the virtual network, capabilities associated with the networks, network resources, and/or systems, interactions between the networks, network resources, and/or systems, etc. User device 210 may provide network requirements 1110 to ECN device 220, and ECN device 220 may receive network requirements 1110. Based on network requirements 1110, ECN device 220 may select one or more networks, network resources, and/or systems for user device 210 to utilize. For example, as shown in FIG. 11, ECN device 220 may select, based on network requirements 1110, EPC network 230-1 for user device 210 to utilize, as indicated by reference number 1120. ECN device 220 may also select, based on network requirements 1110, analytics and reporting system 250-1 for user device 210 to utilize, as indicated by reference number 1130.

ECN device 220 may enable user device 210 to utilize the selected one or more networks, network resources, and/or systems. For example, ECN device 220 may provide user device 210 with access to the data center devices that provide the functionality associated with the selected one or more networks, network resources, and/or systems. As shown in FIG. 11, ECN device 220 may enable user device 210 to utilize EPC network 230-1, as indicated by reference number 1140. ECN device 220 may also enable user device 210 to utilize analytics and reporting system 250-1, as indicated by reference number 1150.

Once user device 210 is enabled to utilize the selected one or more networks, network resources, and/or systems, user device 210 may provide traffic to ECN device 220. The traffic may include, for example, a communication (e.g., a call, a SMS message, etc.) to be routed by the selected one or more networks and/or network resources; information (e.g., billing information) to be provided to a selected system; etc. ECN device 220 may receive the traffic, and may provide the traffic to the selected one or more networks, network resources, and/or systems. Alternatively, or additionally, user device 210 may provide the traffic directly to the selected one or more networks, network resources, and/or systems, without passing through ECN device 220.

Although FIG. 11 shows example components of environment portion 1100, in other implementations, environment portion 1100 may include fewer components, different components, differently arranged components, or additional components than depicted in FIG. 11. Additionally, or alternatively, one or more components of environment portion 1100 may perform one or more other tasks described as being performed by one or more other components of environment portion 1100.

Figure 12:
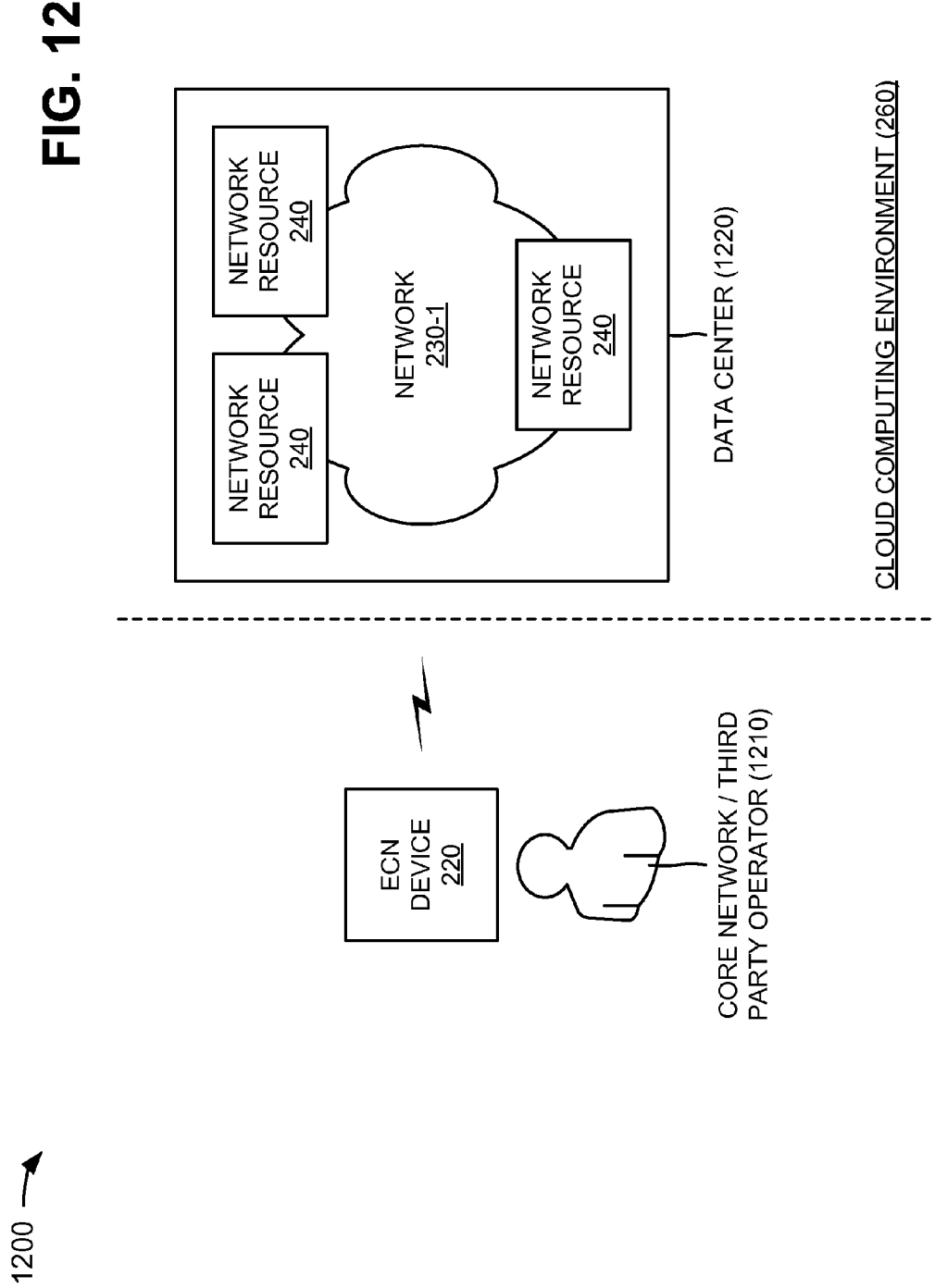
FIG. 12 is a diagram of an example management scenario for an example portion of the environment in FIG. 2.

FIG. 12 is a diagram of an example management scenario for an example portion 1200 of environment 200 (FIG. 2). As shown, environment portion 1200 may include ECN device 220, network 230-1, network resources 240, cloud computing environment 260, a core network and/or third party operator 1210, and a data center 1220. ECN device 220, network 230-1, network resources 240, and cloud computing environment 260 may include the features described above in connection with, for example, one or more of FIGS. 1-11.

Environment portion 1200 may be operated by a third party such as third party operator 1210. Data center 1220 may be owned and operated by either a core network operator or a third party data center operator. Data center 1220 may include a facility used to house computer systems and associated components, such as telecommunications devices and storage systems. Data center 1220 may include redundant or backup power supplies, redundant data communications connections, environmental controls (e.g., air conditioning, fire suppression, etc.), and security devices.

Environment portion 1200 may include separate elements in network 230-1, such as separate network resources 240. In one example, network 230-1 may correspond to an EPC network that includes separate EPC core elements. Network 230-1 and/or network resources 240 may be shared with multiple network operators and may be referred to as a multiple operator core network (MOCN). Although not shown in FIG. 12, data center 1220 may provide virtualized systems for network 230-1 and/or network resources 240, such as, for example, a virtualized operations support system, a virtualized billing support system, a virtualized analytics and reporting system, etc.

In one example implementation, a third party data center, separate from data center 1220, may be used to manage network 230-1 and network resources 240 provided by data center 1220. A separate operations team may operate the third party data center. Alternatively, or additionally, core network operator 1220 may lease access to network 230-1 and/or network resources 240 provided by data center 1220, and data center 1220 may be owned and operated by a third party. Such an arrangement may be beneficial to core network operator 1220 associated with an operational expense (OPEX) oriented entity.

Although FIG. 12 shows example components of environment portion 1200, in other implementations, environment portion 1200 may include fewer components, different components, differently arranged components, or additional components than depicted in FIG. 12. Additionally, or alternatively, one or more components of environment portion 1200 may perform one or more other tasks described as being performed by one or more other components of environment portion 1200.

Figure 13:
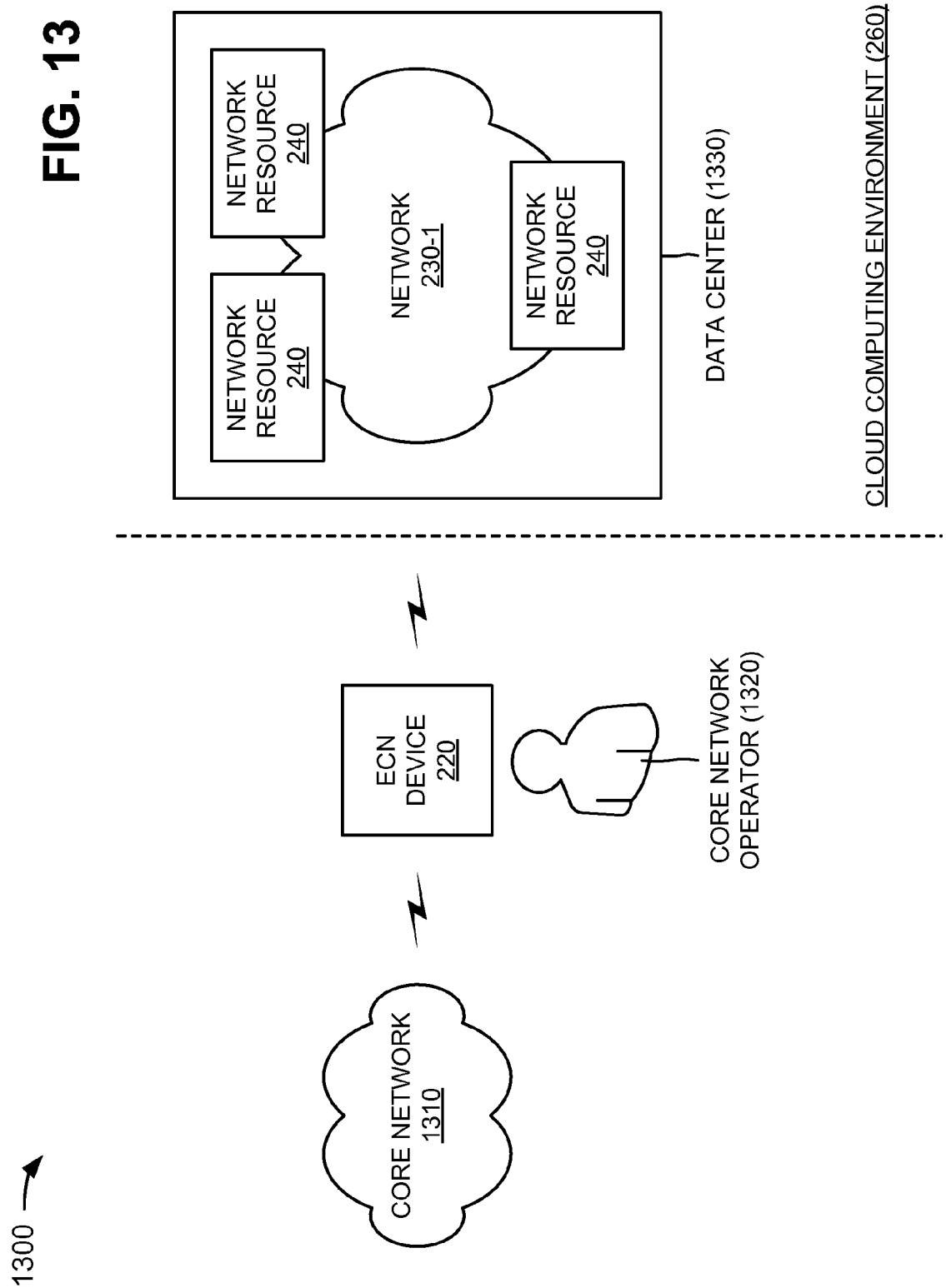
FIG. 13 is a diagram of another example management scenario for an example portion of the environment in FIG. 2.

FIG. 13 is a diagram of another example management scenario for an example portion 1300 of environment 200 (FIG. 2). As shown, environment portion 1300 may include ECN device 220, network 230-1, network resources 240, cloud computing environment 260, a core network 1310, a core network operator 1320, and a data center 1330. ECN device 220, network 230-1, network resources 240, and cloud computing environment 260 may include the features described above in connection with, for example, one or more of FIGS. 1-12.

Core network 1310 may include a core network architecture of the 3GPP LTE wireless communication standard. In one example, core network 1310 may include an all-IP packet-switched core network that supports high-speed wireless and wireline broadband access technologies. Alternatively, or additionally, core network 1310 may provide packet-switched voice services (e.g., which are traditionally circuit-switched) using an IMS network. Core network 1310 may be operated by core network operator 1320.

ECN device 220, network 230-1, and network resources 240 may be what is referred to as a supplemental overlay network that may be integrated with core network 1310. The supplemental overlay network may be implemented using COTS hardware (e.g., in data center 1330) and cloud computing management systems. The supplemental overlay network may provide one or more network elements that may typically be provided in core network 1310. Thus, the supplemental overlay network may allow core network operator 1320 to implement a lower cost core network 1310 and to improve implementation of processes with a minimal impact on core network 1310.

Data center 1330 may be owned and operated by either core network operator 1320 or a third party data center operator. Data center 1330 may include a facility used to house computer systems and associated components, such as telecommunications devices and storage systems. Data center 1330 may include redundant or backup power supplies, redundant data communications connections, environmental controls (e.g., air conditioning, fire suppression, etc.), and security devices.

Although not shown in FIG. 13, data center 1330 may provide virtualized network resources and/or systems for core network 1310, such as, for example, a virtualized operations support system, a virtualized billing support system, a virtualized analytics and reporting system, a virtualized pool of MMEs, etc. Such virtualized network resources and/or systems may be integrated with core network 1310.

In one example implementation, a third party data center, separate from data center 1330, may be used to manage network 230-1 and network resources 240 provided by data center 1330. An integrated operations team may operate the third party data center. Alternatively, or additionally, core network operator 1320 may own and operate network 230-1 and/or network resources 240 provided by data center 1220. Such an arrangement may be beneficial to core network operator 1320 associated with a capital expense (CAPEX) oriented entity.

Although FIG. 13 shows example components of environment portion 1300, in other implementations, environment portion 1300 may include fewer components, different components, differently arranged components, or additional components than depicted in FIG. 13. Additionally, or alternatively, one or more components of environment portion 1300 may perform one or more other tasks described as being performed by one or more other components of environment portion 1300.

Figure 14:
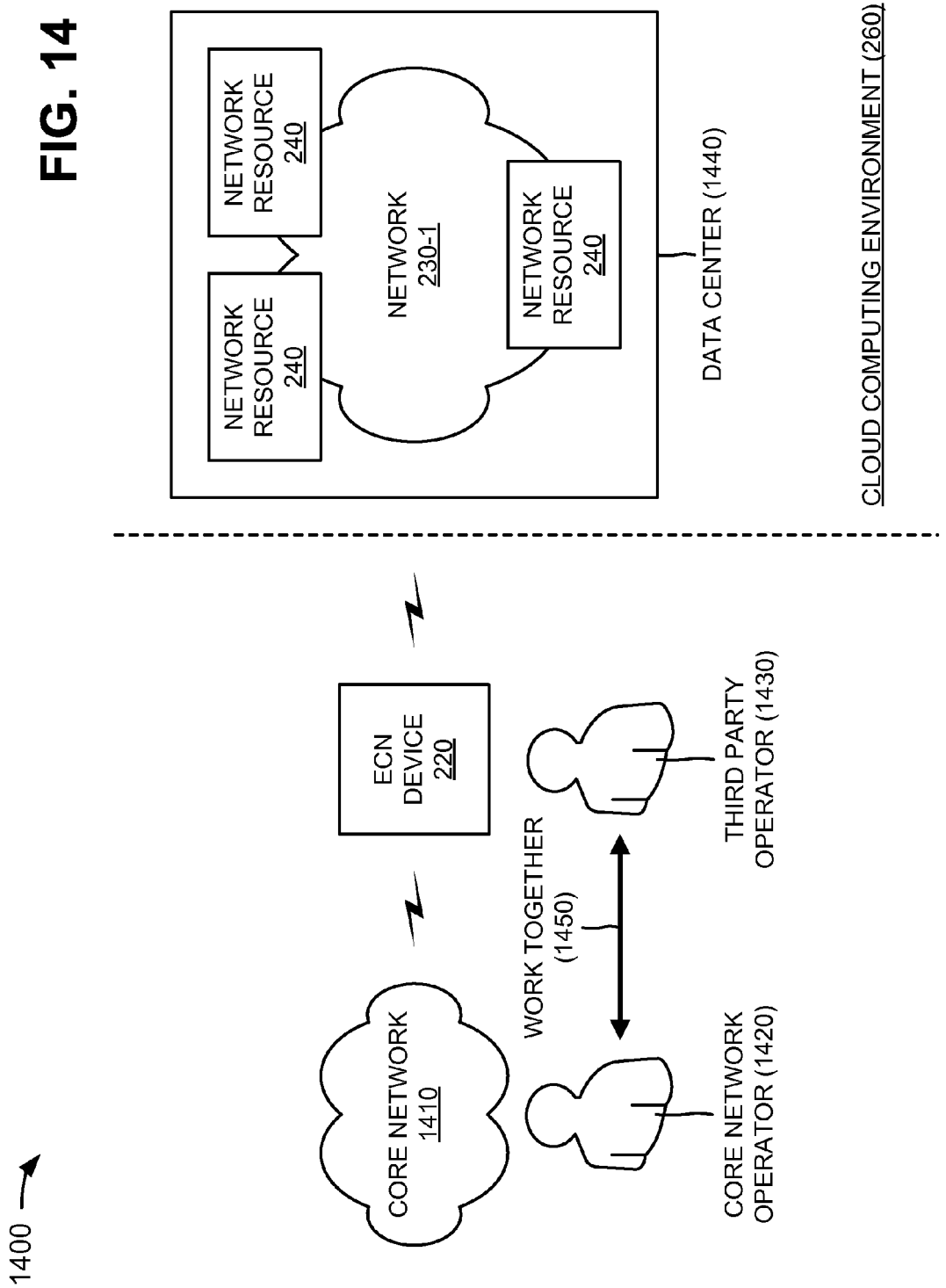
FIG. 14 is a diagram of still another example management scenario for an example portion of the environment in FIG. 2.

FIG. 14 is a diagram of still another example management scenario for an example portion 1400 of environment 200 (FIG. 2). As shown, environment portion 1400 may include ECN device 220, network 230-1, network resources 240, cloud computing environment 260, a core network 1410, a core network operator 1420, a third party operator 1430, and a data center 1440. ECN device 220, network 230-1, network resources 240, and cloud computing environment 260 may include the features described above in connection with, for example, one or more of FIGS. 1-13.

Core network 1410 may include a core network architecture of the 3GPP LTE wireless communication standard. In one example, core network 1410 may include an all-IP packet-switched core network that supports high-speed wireless and wireline broadband access technologies. Alternatively, or additionally, core network 1410 may provide packet-switched voice services (e.g., which are traditionally circuit-switched) using an IMS network. Core network 1410 may be operated by core network operator 1420.

ECN device 220 and data center 1440 may be owned and operated by third party operator 1430. Data center 1440 may include a facility used to house computer systems and associated components, such as telecommunications devices and storage systems. Data center 1440 may include redundant or backup power supplies, redundant data communications connections, environmental controls (e.g., air conditioning, fire suppression, etc.), and security devices.

Environment portion 1400 may be what is referred to as a hybrid deployment network where core network operator 1420 and third party operator 1430 may work together to create an optimal network architecture, as indicated by reference number 1450. The hybrid deployment network may be focused on balancing the needs of core network 1410/core network operator 1420 while providing a minimally invasive integration model.

Network 230-1 and/or network resources 240 may be shared with multiple network operators and may be referred to as a MOCN. Although not shown in FIG. 14, data center 1440 may provide virtualized systems for network 230-1 and/or network resources 240, such as, for example, a virtualized operations support system, a virtualized billing support system, a virtualized analytics and reporting system, etc.

In one example implementation, a third party data center, separate from data center 1440, may be used to manage network 230-1 and network resources 240 provided by data center 1440. A core network operations team may be utilized instead of core network operator 1420. Alternatively, or additionally, operation of core network 1410 may be outsourced to third party operator 1430. Alternatively, or additionally, core network operator 1420 may lease access to network 230-1 and/or network resources 240 provided by data center 1440. Such an arrangement may be beneficial to core network operator 1420 associated with an OPEX oriented entity.

Although FIG. 14 shows example components of environment portion 1400, in other implementations, environment portion 1400 may include fewer components, different components, differently arranged components, or additional components than depicted in FIG. 14. Additionally, or alternatively, one or more components of environment portion 1400 may perform one or more other tasks described as being performed by one or more other components of environment portion 1400.

Figure 15:
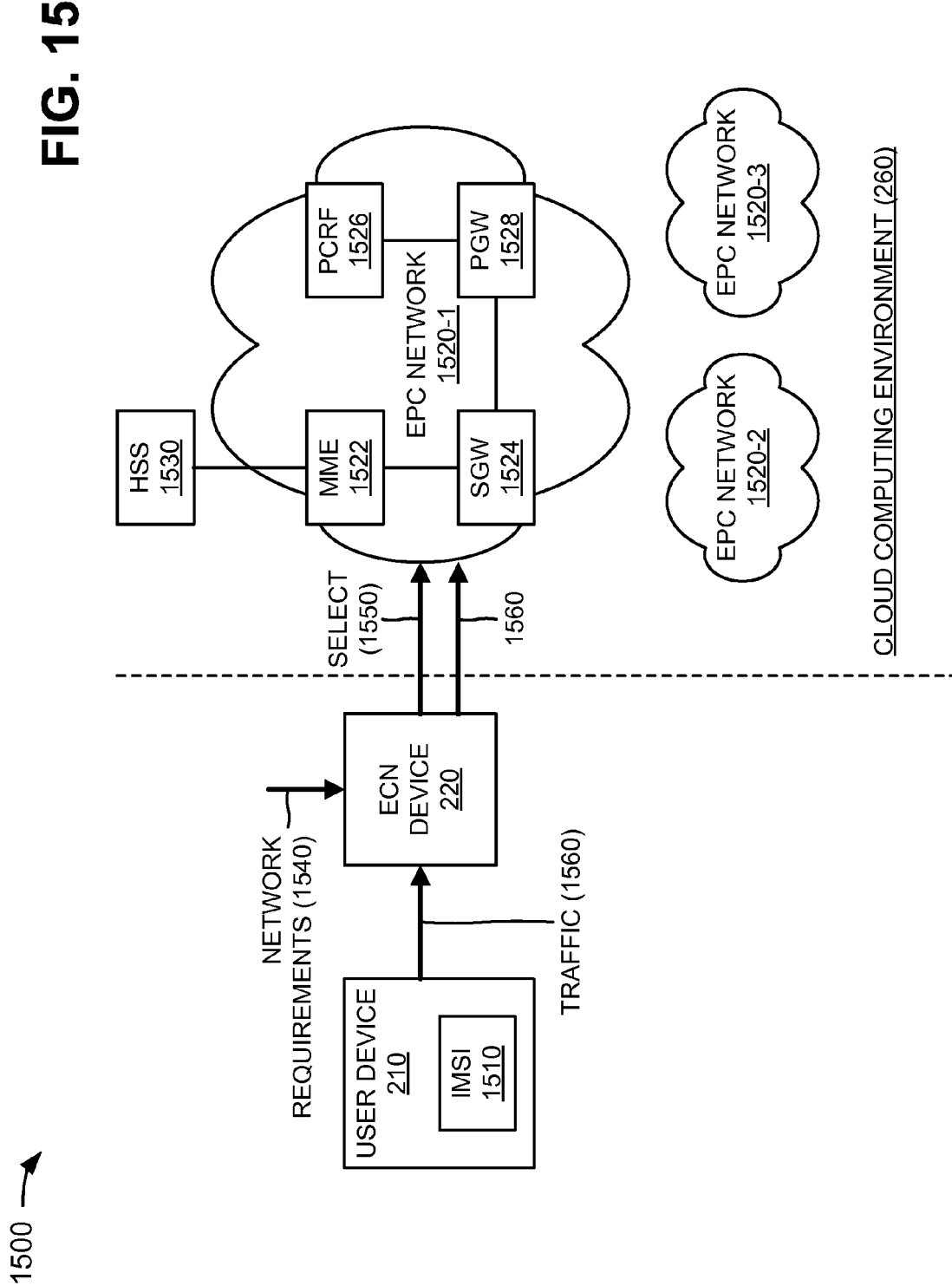
FIG. 15 is a diagram of example operations for selecting and using a core network hosted in a cloud computing environment.

FIG. 15 is a diagram of example operations for selecting and using a core network hosted in a cloud computing environment provided by a portion 1500 of environment 200 (FIG. 2). As shown, environment portion 1500 may include user device 210, ECN device 220, cloud computing environment 260, an International Mobile Subscriber Identity (IMSI) 1510 (e.g., associated with user device 210), and three EPC networks 1520-1 through 1520-3 (collectively referred to herein as EPC networks 1520, and, in some instances, singularly as EPC network 1520). User device 210, ECN device 220, and cloud computing environment 260 may include the features described above in connection with, for example, one or more of FIGS. 1-14.

IMSI 1510 may include a unique identification associated with a user of user device 210. IMSI 1510 may be stored as a field in a subscriber identity module (SIM) provided inside user device 210, and may be sent by user device 210 to ECN device 220 and/or a network associated with user device 210. IMSI 1510 may be replaced with other identifiers, such as, for example, a mobile equipment identifier (MEID).

EPC network 1520-1 may include a virtualized core network architecture of the 3GPP LTE wireless communication standard provided by cloud computing environment 260. In one example, EPC network 1520-1 may include an all-IP packet-switched core network that supports high-speed wireless and wireline broadband access technologies. EPC network 1520-1 may include a MME 1522, a SGW 1524, a policy and charging rule function (PCRF) 1526, a packet data network (PDN) gateway (PGW) 1528, and a home subscriber server (HSS) 1530. EPC networks 1520-2 and 1520-3 may be similarly arranged.

MME 1522 may be responsible for idle mode tracking and paging procedures (e.g., including retransmissions) for user device 210. MME 1522 may be involved in a bearer activation/deactivation process (e.g., for user device 210) and may choose a SGW for user device 210 at an initial attach and at a time of intra-LTE handover. MME 1522 may authenticate user device 210 (e.g., via interaction with HSS 1530). Non-access stratum (NAS) signaling may terminate at MME 1522 and MME 1522 may generate and allocate temporary identities to user devices (e.g., user device 210). MME 1522 may check authorization of user device 210 to camp on a service provider's Public Land Mobile Network (PLMN) and may enforce roaming restrictions for user device 210. MME 1522 may be a termination point in EPC network 1520-1 for ciphering/integrity protection for NAS signaling and may handle security key management. MME 1522 may provide a control plane function for mobility between LTE and access networks with a S3 interface terminating at MME 1522. MME 1522 may also terminate a S6a interface towards HSS 1530 for roaming user devices.

SGW 1524 may route and forward user data packets, may act as a mobility anchor for a user plane during inter-eNodeB handovers, and may act as an anchor for mobility between LTE and other 3GPP technologies. For idle state user devices, SGW 1524 may terminate a downlink (DL) data path and may trigger paging when DL data arrives for user device 210. SGW 1524 may manage and store contexts associated with user device 210 (e.g., parameters of an IP bearer service, network internal routing information, etc.).

PCRF 1526 may provide policy control decision and flow based charging control functionalities. PCRF 1526 may provide network control regarding service data flow detection, gating, quality of service (QoS) and flow based charging, etc. PCRF 1526 may determine how a certain service data flow shall be treated, and may ensure that user plane traffic mapping and treatment is in accordance with a user's subscription profile.

PGW 1528 may provide connectivity of user device 210 to external packet data networks by being a traffic exit/entry point for user device 210. User device 210 may simultaneously connect to more than one PGW for accessing multiple PDNs. PGW 1528 may perform policy enforcement, packet filtering for each user, charging support, lawful intercept, and packet screening. PGW 1528 may also act as an anchor for mobility between 3GPP and non-3GPP technologies.

HSS 1530 may include a master user database that supports devices that handle calls. HSS 1530 may contain subscription-related information (e.g., subscriber profiles), may perform authentication and authorization of a user, and may provide information about a subscriber's location and IP information.

As further shown in FIG. 15, ECN device 220 may receive network requirements 1540 from an entities utilizing EPC networks 1520 provided by cloud computing environment 260. In one example, network requirements 1540 may include IMSI ranges of users that are permitted to utilize EPC networks 1520. The IMSI ranges may be provided in user devices (e.g., in SIMs) of the users permitted to utilize EPC networks 1520. Alternatively, or additionally, network requirements 1540 may include information associated with a virtual network that the entities wish to implement, such as networks, network resources, and/or systems required for the virtual network, capabilities associated with the networks, network resources, and/or systems, interactions between the networks, network resources, and/or systems, etc.

Based on network requirements 1540, ECN device 220 may select one or more networks, network resources, and/or systems for user device 210 to utilize. For example, as shown in FIG. 15, ECN device 220 may select, based on network requirements 1540, EPC network 1520-1, MME 1522, SGW 1524, PCRF 1526, PGW 1528, and HSS 1530 for user device 210 to utilize, as indicated by reference number 1550. ECN device 220 may enable user device 210 to utilize the selected one or more networks, network resources, and/or systems. For example, ECN device 220 may provide user device 210 with access to the data center devices that provide the functionality associated with the selected one or more networks, network resources, and/or systems. With reference to FIG. 15, ECN device 220 may enable user device 210 to utilize EPC network 1520-1, MME 1522, SGW 1524, PCRF 1526, PGW 1528, and HSS 1530.

Once user device 210 is enabled to utilize the selected one or more networks, network resources, and/or systems, user device 210 may provide traffic 1560 to ECN device 220. Traffic 1560 may include, for example, IMSI 1510 associated with user device 210; a communication (e.g., a call, a SMS message, etc.) to be routed by the selected one or more networks and/or network resources; information (e.g., billing information) to be provided to a selected system; etc. ECN device 220 may receive traffic 1560, and may provide, based on IMSI 1510, traffic 1560 to the selected one or more networks, network resources, and/or systems. For example, based on IMSI 1510, ECN device 220 may steer traffic 1560 to EPC network 1520-1 and one or more of the components associated with EPC network 1520-1.

In one example implementation, ECN device 220 may correspond to a base station or an eNodeB associated with user device 210 and may include MOCN functionality. A network operator may own and operate ECN device 220, while a third party operator may own and operate cloud computing environment 260 and EPC networks 1520. Alternatively, or additionally, the network operator may own and operate a primary EPC network, and may lease access to a secondary EPC network (e.g., EPC network 1520-1 provided by cloud computing environment 260. In one example, the secondary EPC network may host machine-to-machine connections and may operate at a lower cost than the primary EPC network.

In one example implementation, a virtual routing function (VRF) or a routing context may be provided in a backhaul network to provide routing from ECN device 220 to a backhaul router and then to EPC network 1520-1. Alternatively, or additionally, a separate backhaul link, a separate backhaul aggregation router, and/or a separate cell site router may be used to provide routing to EPC network 1520-1. Alternatively, or additionally, MME 1522 may be provided in a pool of MMEs that is separate from EPC network 1520-1, and HSS 1530 may be provided in a network that is separate from EPC network 1520-1. Alternatively, or additionally, EPC network 1520-1 may be deployed as a hardware system or as a virtual system. When EPC network 1520-1 is deployed as a virtual system, a Diameter routing agent may be provided in front of the virtual elements (e.g., SGW 1524, PCRF 1526, etc.) to control unauthorized access to EPC network 1520-1.

Although FIG. 15 shows example components of environment portion 1500, in other implementations, environment portion 1500 may include fewer components, different components, differently arranged components, or additional components than depicted in FIG. 15. Additionally, or alternatively, one or more components of environment portion 1500 may perform one or more other tasks described as being performed by one or more other components of environment portion 1500.

Figure 16:
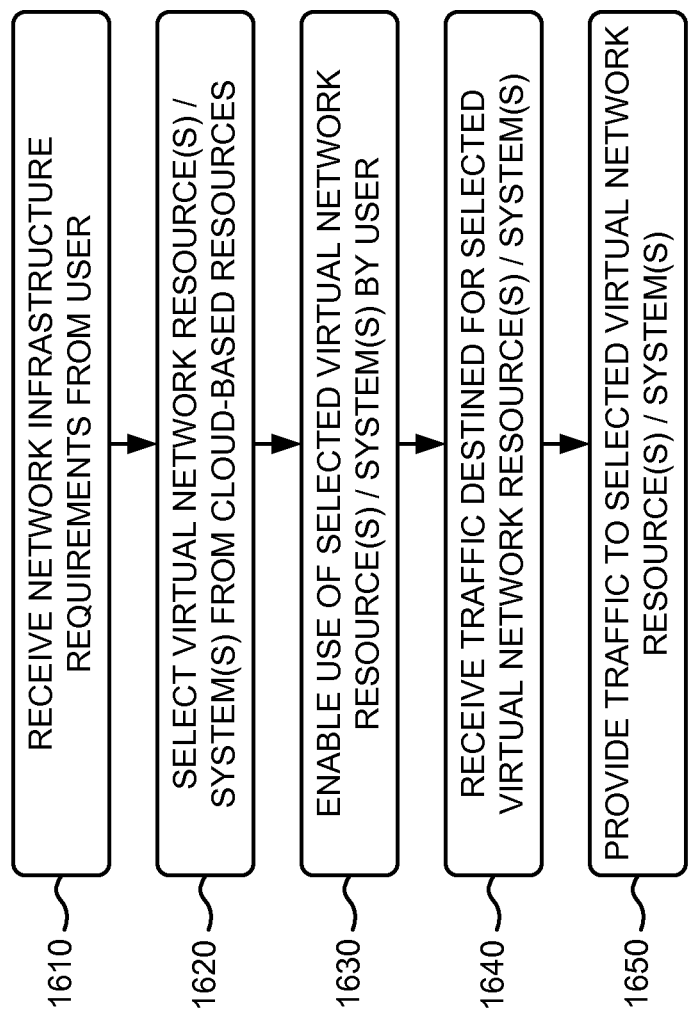
FIGS. 16-18 are flow charts of an example process for providing overlay networks via elastic cloud networking according to an implementation described herein.
Figure 17:
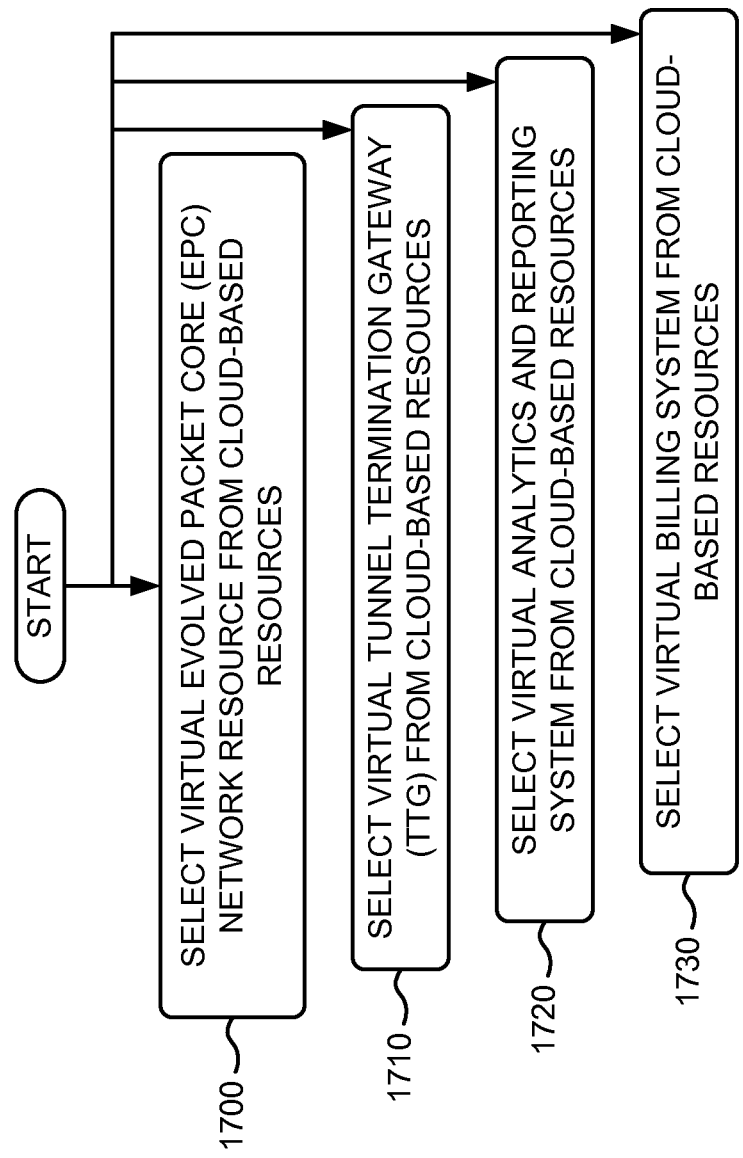
Figure 18:
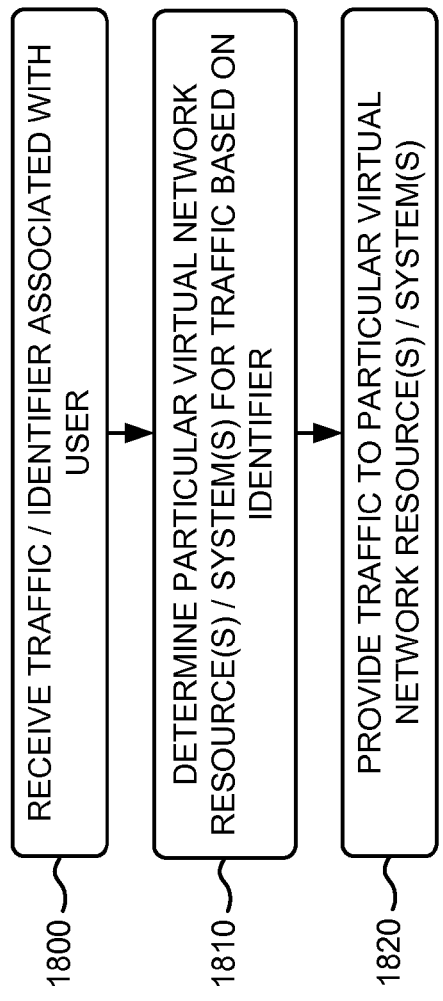

FIGS. 16-18 are flow charts of an example process 1600 for providing overlay networks via elastic cloud networking according to an implementation described herein. In one implementation, process 1600 may be performed by ECN device 220. Alternatively, or additionally, some or all of process 1600 may be performed by another device or group of devices, including or excluding ECN device 220.

As shown in FIG. 16, process 1600 may include receiving network infrastructure requirements from a user (block 1610), and selecting virtual network resource(s) and/or system(s) from cloud-based resources (block 1620). For example, in an implementation described above in connection with FIG. 4, a user of user device 210 may provide network requirements 410 to user device 210. Network requirements 410 may include information associated with a virtual network that the user wishes to implement, such as networks, network resources, and/or systems required for the virtual network, capabilities associated with the networks, network resources, and/or systems, interactions between the networks, network resources, and/or systems, etc. User device 210 may provide network requirements 410 to ECN device 220, and ECN device 220 may receive network requirements 410. Based on network requirements 410, ECN device 220 may select one or more networks, network resources, and/or systems for user device 210 to utilize. In one example, ECN device 220 may select, based on network requirements 410, network 230-1 and network resource 240 for user device 210 to utilize, as indicated by reference number 420-1. ECN device 220 may also select, based on network requirements 410, system 250 for user device 210 to utilize, as indicated by reference number 420-2.

As further shown in FIG. 16, process 1600 may include enabling use of the selected virtual network resource(s) and/or system(s) by the user (block 1630). For example, in an implementation described above in connection with FIG. 4, ECN device 220 may enable user device 210 to utilize the selected one or more networks, network resources, and/or systems. In one example, ECN device 220 may provide user device 210 with access to the data center devices that provide the functionality associated with the selected one or more networks, network resources, and/or systems. ECN device 220 may enable user device 210 to utilize network 230-1 and network resource 240, as indicated by reference number 430-1. ECN device 220 may also enable user device 210 to utilize system 250, as indicated by reference number 430-2.

Returning to FIG. 16, process 1600 may include receiving traffic destined for the selected virtual network resource(s) and/or system(s) (block 1640), and providing the traffic to the selected virtual network resource(s) and/or system(s) (block 1650). For example, in an implementation described above in connection with FIG. 4, once user device 210 is enabled to utilize the selected one or more networks, network resources, and/or systems, user device 210 may provide traffic to ECN device 220. The traffic may include, for example, a communication (e.g., a call, a SMS message, etc.) to be routed by the selected one or more networks and/or network resources; information (e.g., billing information) to be provided to a selected system; etc. ECN device 220 may receive the traffic, and may provide the traffic to the selected one or more networks, network resources, and/or systems. Alternatively, or additionally, user device 210 may provide the traffic directly to the selected one or more networks, network resources, and/or systems, without passing through ECN device 220.

Process block 1620 may include the process blocks depicted in FIG. 17. As shown in FIG. 17, process block 1620 may include one or more of selecting a virtual EPC network resource from the cloud-based resources (block 1700), selecting a virtual TTG from the cloud-based resources (block 1710), selecting a virtual analytics and reporting system from the cloud-based resources (block 1720), and selecting a virtual billing system from the cloud-based resources (block 1730). For example, in an implementation described above in connection with FIG. 11, based on network requirements 1110, ECN device 220 may select one or more networks, network resources, and/or systems for user device 210 to utilize. In one example, ECN device 220 may select, based on network requirements 1110, a network resource of EPC network 230-1 (e.g., a MME, a PGW, etc.) for user device 210 to utilize. ECN device 220 may also select, based on network requirements 1110, TTG 240, analytics and reporting system 250-1, and/or billing system 250-2 for user device 210 to utilize.

Process blocks 1640/1650 may include the process blocks depicted in FIG. 18. As shown in FIG. 18, process blocks 1640/1650 may include receiving the traffic and an identifier associated with the user (block 1800), determining particular virtual network resource(s) and/or system(s) for the traffic based on the identifier (block 1810), and providing the traffic to the particular virtual network resource(s) and/or system(s) (block 1820). For example, in an implementation described above in connection with FIG. 15, once user device 210 is enabled to utilize the selected one or more networks, network resources, and/or systems, user device 210 may provide traffic 1560 to ECN device 220. Traffic 1560 may include, for example, IMSI 1510 associated with user device 210; a communication (e.g., a call, a SMS message, etc.) to be routed by the selected one or more networks and/or network resources; information (e.g., billing information) to be provided to a selected system; etc. ECN device 220 may receive traffic 1560, and may provide, based on IMSI 1510, traffic 1560 to the selected one or more networks, network resources, and/or systems. In one example, based on IMSI 1510, ECN device 220 may steer traffic 1560 to EPC network 1520-1 and one or more of the components associated with EPC network 1520-1.

Systems and/or methods described herein may provide a network architecture using cloud computing techniques (e.g., virtual machines (VMs), hypervisors, etc.) to operate, manage, and scale systems of the network architecture. The systems and/or methods may lay a foundation for a transition from dedicated hardware-based network systems to using data center class computer systems for virtual network implementation. The systems and/or methods may create highly scalable virtual networks with lower operational and capital costs than current dedicated networks.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 16-18, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more."

Where only one item is intended, the term "one" or similar language is used. Further, the phrase "based on" is intended to mean "based, at least in part, on" unless explicitly stated otherwise.

What is claimed is:

1. A method comprising:
   receiving, by a device, network infrastructure requirements from a user;
   selecting, by the device and based on the network infrastructure requirements, a virtual core network, a virtual network resource, and a virtual system from resources provided in a cloud computing environment,
   selecting the virtual core network, the virtual network resource, and the virtual system including:
      selecting a virtual tunnel termination gateway (TTG) based on the resources provided in the cloud computing environment;
      selecting a virtual analytics and reporting system based on the resources provided in the cloud computing environment; and
      selecting a virtual billing system based on the resources provided in the cloud computing environment;
   enabling, by the device, use of the virtual core network, the virtual network resource, and the virtual system by the user;
   receiving, by the device and from the user, traffic destined for the virtual core network, the virtual network resource, and the virtual system; and
   providing, by the device, the traffic to the virtual core network, the virtual network resource, and the virtual system.

2. The method of claim 1, where the virtual core network includes at least one of:
   a virtual evolved packet core (EPC) network,
   a virtual content delivery network, or
   a virtual session delivery network.

3. The method of claim 1, where the virtual network resource includes one or more of:
   a virtual mobility management entity (MME),
   a virtual serving gateway (SGW),
   a virtual policy and charging rule function (PCRF),
   a virtual packet data network (PDN) gateway (PGW),
   a virtual home subscriber server (HSS),
   a virtual domain name server (DNS), or
   a virtual firewall.

4. The method of claim 1, where the virtual system includes a virtual load balancing system.

5. The method of claim 1, further comprising:
   receiving an identifier associated with the user;
   determining, based on the identifier, a particular virtual core network, a particular virtual network resource, or a particular virtual system from the virtual core network, the virtual network resource, or the virtual system; and
   providing the traffic to the particular virtual core network, the particular virtual network resource, or the particular virtual system.

6. The method of claim 5, where the identifier includes an International Mobile Subscriber Identity (IMSI).

7. The method of claim 1, where the cloud computing environment is operated by an entity separate from the user.

8. A device comprising:
   a processor to:
      receive network infrastructure requirements from a user,
      select, based on the network infrastructure requirements, a virtual core network, a virtual network resource, and a virtual system from resources provided in a cloud computing environment,
the processor, when selecting the virtual core network, the virtual network resource, and the virtual system, being to:
select a virtual tunnel termination gateway (TTG) based on the resources provided in the cloud computing environment,
select a virtual analytics and reporting system based on the resources provided in the cloud computing environment, and
select a virtual billing system based on the resources provided in the cloud computing environment,
enable use of the virtual core network, the virtual network resource, and the virtual system by the user,
receive, from the user, traffic destined for the virtual core network, the virtual network resource, and the virtual system, and
provide the traffic to the virtual core network, the virtual network resource, and the virtual system.

9. The device of claim 8, where the virtual core network includes at least one of:
a virtual evolved packet core (EPC) network,
a virtual content delivery network, or
a virtual session delivery network.

10. The device of claim 8, where the virtual network resource includes one or more of:
a virtual mobility management entity (MME),
a virtual serving gateway (SGW),
a virtual policy and charging rule function (PCRF),
a virtual packet data network (PDN) gateway (PGW),
a virtual home subscriber server (HSS),
a virtual domain name server (DNS), or
a virtual firewall.

11. The device of claim 8, where the virtual system includes
a virtual load balancing system.

12. The device of claim 8, where the processor is further to:
receive an identifier associated with the user,
determine, based on the identifier, a particular virtual core network, a particular virtual network resource, or a particular virtual system from the virtual core network, the virtual network resource, or the virtual system, and
provide the traffic to the particular virtual core network, the particular virtual network resource, or the particular virtual system.

13. The device of claim 12, where the identifier includes an International Mobile Subscriber Identity (IMSI).

14. The device of claim 12, where the identifier is provided in the traffic.

15. A non-transitory computer-readable medium storing instructions, the instructions comprising:
one or more instructions that, when executed by a processor of a device, cause the processor to:
receive network infrastructure requirements from a user,
select, based on the network infrastructure requirements, a virtual core network, a virtual network resource, and a virtual system from resources provided in a cloud computing environment,
the one or more instructions to select the virtual core network, the virtual network resource, and the virtual system, including:
one or more instructions to select a virtual tunnel termination gateway (TTG) based on the resources provided in the cloud computing environment,
one or more instructions to select a virtual analytics and reporting system based on the resources provided in the cloud computing environment, and
one or more instructions to select a virtual billing system based on the resources provided in the cloud computing environment,
enable use of the virtual core network, the virtual network resource, and the virtual system by the user,
receive, from the user, traffic destined for the virtual core network, the virtual network resource, and the virtual system, and
provide the traffic to the virtual core network, the virtual network resource, and the virtual system.

16. The non-transitory computer-readable medium of claim 15, where the virtual core network includes at least one of:
a virtual evolved packet core (EPC) network provided by the resources of the cloud computing environment,
a virtual content delivery network provided by the resources of the cloud computing environment, or
a virtual session delivery network provided by the resources of the cloud computing environment.

17. The non-transitory computer-readable medium of claim 15, where the virtual network resource includes one or more of:
a virtual mobility management entity (MME) provided by the resources of the cloud computing environment,
a virtual serving gateway (SGW) provided by the resources of the cloud computing environment,
a virtual policy and charging rule function (PCRF) provided by the resources of the cloud computing environment,
a virtual packet data network (PDN) gateway (PGW) provided by the resources of the cloud computing environment,
a virtual home subscriber server (HSS) provided by the resources of the cloud computing environment,
a virtual domain name server (DNS) provided by the resources of the cloud computing environment, or
a virtual firewall provided by the resources of the cloud computing environment.

18. The non-transitory computer-readable medium of claim 15, where the virtual system includes
a virtual load balancing system provided by the resources of the cloud computing environment.

19. The non-transitory computer-readable medium of claim 15, where the instructions further include:
one or more instructions that, when executed by the processor, cause the processor to:
receive an identifier associated with the user,
determine, based on the identifier, a particular virtual core network, a particular virtual network resource, or a particular virtual system from the virtual core network, the virtual network resource, or the virtual system, and
provide the traffic to the particular virtual core network, the particular virtual network resource, or the particular virtual system.

20. The non-transitory computer-readable medium of claim 19, where the identifier includes an International Mobile Subscriber Identity (IMSI).

* * * * *